(12) United States Patent
Sato et al.

(10) Patent No.: US 11,592,700 B2
(45) Date of Patent: Feb. 28, 2023

(54) LIGHT GUIDE ELEMENT COMPRISING INCIDENCE, INTERMEDIATE, AND EMISSION DIFFRACTION EELMENTS PROVIDED ON A LIGHT GUIDE PLATE AND IMAGE DISPLAY APPARATUS

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/824,125

(22) Filed: May 25, 2022

(65) Prior Publication Data

US 2022/0283465 A1 Sep. 8, 2022

Related U.S. Application Data

(63) Continuation of application No. PCT/JP2020/043676, filed on Nov. 24, 2020.

(30) Foreign Application Priority Data

Nov. 26, 2019 (JP) .............................. JP2019-212876

(51) Int. Cl.
*G02F 1/1335* (2006.01)
*G02F 1/1337* (2006.01)
*G02F 1/137* (2006.01)

(52) U.S. Cl.
CPC ...... *G02F 1/133504* (2013.01); *G02F 1/1337* (2013.01); *G02F 1/13718* (2013.01); *G02F 1/133524* (2013.01)

(58) Field of Classification Search
CPC .............. G02B 5/1819; G02B 6/29328; G02F 2201/305; G02F 2203/22
See application file for complete search history.

(56) References Cited

U.S. PATENT DOCUMENTS

2009/0303599 A1 12/2009 Levola
2015/0277117 A1* 10/2015 Yamada ............. G02B 27/0172
385/37
(Continued)

FOREIGN PATENT DOCUMENTS

CN 109445219 A 3/2019
JP 2008-546020 A 12/2008
(Continued)

OTHER PUBLICATIONS

International Preliminary Report on Patentability and Written Opinion of the International Searching Authority for International Application No. PCT/JP2020/043676, dated Jun. 9, 2022, with an English translation.
(Continued)

*Primary Examiner* — Paul C Lee
(74) *Attorney, Agent, or Firm* — Birch, Stewart, Kolasch & Birch, LLP

(57) ABSTRACT

Provided are: a light guide element that includes an intermediate diffraction element to expand exit pupil such that a light utilization efficiency is high and a decrease in the brightness of an image to be displayed can be suppressed; and an image display apparatus. The light guide element includes a light guide plate, an incidence diffraction element, an intermediate diffraction element, and an emission diffraction element, in which the incidence diffraction element, the intermediate diffraction element, and the emission diffraction element include a liquid crystal layer that is formed of a composition including a liquid crystal compound and has a liquid crystal alignment pattern in which a direction of an optical axis derived from the liquid crystal compound changes while continuously rotating in at least one in-plane direction, in a cross-section of the liquid crystal layer observed with a SEM, bright portions and dark portions derived from a liquid crystal phase are tilted with respect to (Continued)

a main surface of the liquid crystal layer, and in a case where an interval between the bright portions or between the dark portions is represented by a ½ pitch, the pitch $P_{in}$ of the incidence diffraction element and the pitch $P_e$ of the intermediate diffraction element satisfy $P_{in} < P_e$.

20 Claims, 9 Drawing Sheets

(56) References Cited

U.S. PATENT DOCUMENTS

| | | | |
|---|---|---|---|
| 2016/0282615 A1* | 9/2016 | Yokoyama | G02B 27/4272 |
| 2017/0276957 A1* | 9/2017 | Matsuki | G02B 27/0172 |
| 2018/0164627 A1 | 6/2018 | Oh | |
| 2018/0275350 A1* | 9/2018 | Oh | G02B 6/10 |
| 2021/0011295 A1 | 1/2021 | Sato et al. | |
| 2021/0311259 A1 | 10/2021 | Sato et al. | |
| 2022/0057638 A1 | 2/2022 | Sato et al. | |

FOREIGN PATENT DOCUMENTS

| | | |
|---|---|---|
| WO | WO 2019/189852 A1 | 10/2019 |
| WO | WO 2020/122128 A1 | 6/2020 |
| WO | WO 2020/226078 A1 | 11/2020 |

OTHER PUBLICATIONS

International Search Report for International Application No. PCT/JP2020/043676, dated Feb. 16, 2021, with an English translation.
Kress et al., "Towards the Ultimate Mixed Reality Experience: HoloLens Display Architecture Choices," SID 2017 DIGEST, 2017, pp. 127-131, 5 pages total.

* cited by examiner

LIGHT GUIDE ELEMENT COMPRISING INCIDENCE, INTERMEDIATE, AND EMISSION DIFFRACTION EELMENTS PROVIDED ON A LIGHT GUIDE PLATE AND IMAGE DISPLAY APPARATUS

CROSS-REFERENCE TO RELATED APPLICATIONS

This application is a Continuation of PCT International Application No. PCT/JP2020/043676 filed on Nov. 24, 2020 which claims priority under 35 U.S.C. § 119(a) to Japanese Patent Application No. 2019-212876 filed on Nov. 26, 2019. Each of the above applications is hereby expressly incorporated by reference, in its entirety, into the present application.

BACKGROUND OF THE INVENTION

1. Field of the Invention

The present invention relates to a light guide element that propagates light, and an image display apparatus that includes the light guide element

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that the virtual image is displayed to be superimposed on a scene that a user is actually seeing.

In AR glasses, light (projection light) projected from a display is diffracted (refracted) using an incidence diffraction element to be incident into one end part of a light guide plate. As a result, the light is introduced into the light guide plate at an angle such that the light is totally reflected and propagates in the light guide plate. The light propagated in the light guide plate is also diffracted by an emission diffraction element in the other end part of the light guide plate and is emitted from the light guide plate to an observation position by the user.

In the light guide element used for AR glasses or the like, an intermediate diffraction element is disposed on a light guide plate such that light that is diffracted by the incidence diffraction element to be incident into the light guide plate is diffracted by the intermediate diffraction element, propagates the light guide plate, is diffracted by the emission diffraction element, and is emitted from the light guide plate. As a result, exit pupil can be expanded (refer to JP2008-546020A).

SUMMARY OF THE INVENTION

According to an investigation by the present inventors, it was found that, in a case where an intermediate diffraction element is disposed to expand exit pupil, a light utilization efficiency decreases, and there is a problem in that the brightness of an image to be displayed decreases.

An object of the present invention is to solve the above-described problem of the related art and to provide: a light guide element that includes an intermediate diffraction element to expand exit pupil such that a light utilization efficiency is high and a decrease in the brightness of an image to be displayed can be suppressed; and an image display apparatus including the light guide element.

In order to achieve the object, the present invention has the following configurations.

[1] A light guide element comprising:

a light guide plate; and an incidence diffraction element, an intermediate diffraction element, and an emission diffraction element that are provided on the light guide plate, in which the incidence diffraction element, the intermediate diffraction element, and the emission diffraction element include a liquid crystal layer that is formed of a composition including a liquid crystal compound and has a liquid crystal alignment pattern in which a direction of an optical axis derived from the liquid crystal compound changes while continuously rotating in at least one in-plane direction, in a cross-section of the liquid crystal layer observed with a scanning electron microscope, bright portions and dark portions derived from a liquid crystal phase are tilted with respect to a main surface of the liquid crystal layer, in a case where an interval between the bright portions or between the dark portions in a normal direction of lines formed by the bright portions or the dark portions is represented by a ½ pitch, and in a case where the pitch in the incidence diffraction element is represented by $P_{in}$ and the pitch in the intermediate diffraction element is represented by $P_e$, $P_{in} < P_e$ is satisfied.

[2] The light guide element according to [1], in which in a case where the pitch in the emission diffraction element is represented by $P_{out}$, $P_{out} < P_e$ is satisfied.

[3] The light guide element according to [1] or [2], in which in a case where a length over which the direction of the optical axis derived from the liquid crystal compound in the liquid crystal alignment pattern rotates by 180° in an in-plane direction is set as a single period $\Lambda$ of a diffraction structure, and in a case where a single period of a diffraction structure of the incidence diffraction element is represented by $\Lambda_{in}$, a single period of a diffraction structure of the intermediate diffraction element is represented by $\Lambda_e$, and a single period of a diffraction structure of the emission diffraction element is represented by $\Lambda_{out}$, $\Lambda_e \leq \Lambda_{in}$ and $\Lambda_e \leq \Lambda_{out}$ are satisfied.

[4] The light guide element according to any one of [1] to [3], in which the liquid crystal layer is a cholesteric liquid crystal layer obtained by immobilizing a cholesteric liquid crystalline phase.

[5] The light guide element according to any one of [1] to [4], in which in a case where an in-plane retardation is measured from a normal direction of the main surface of the liquid crystal layer and a direction tilted with respect to and a normal line of the main surface, a direction in which the in-plane retardation is minimum in any one of a slow axis plane or a fast axis plane is tilted from the normal direction.

[6] The light guide element according to any one of [1] to [5], in which periods of diffraction structures of the incidence diffraction element, the intermediate diffraction element, and the emission diffraction element are 0.1 μm or more and 1 μm or less.

[7] An image display apparatus comprising:

the light guide element according to any one of [1] to [6]; and a display element that emits an image to the incidence diffraction element of the light guide element.

According to the present invention, it is possible to provide: a light guide element that includes an intermediate diffraction element to expand exit pupil such that a light utilization efficiency is high and a decrease in the brightness of an image to be displayed can be suppressed; and an image display apparatus including the light guide element.

DESCRIPTION OF THE PREFERRED EMBODIMENTS

Hereinafter, a light guide element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

[Light Guide Element and Image Display Apparatus]

The light guide element according to the embodiment of the present invention comprises:

a light guide plate; and an incidence diffraction element, an intermediate diffraction element, and an emission diffraction element that are provided on the light guide plate, in which the incidence diffraction element, the intermediate diffraction element, and the emission diffraction element include a liquid crystal layer that is formed of a composition including a liquid crystal compound and has a liquid crystal alignment pattern in which a direction of an optical axis derived from the liquid crystal compound changes while continuously rotating in at least one in-plane direction, in a cross-section of the liquid crystal layer observed with a scanning electron microscope, bright portions and dark portions derived from a liquid crystal phase are tilted with respect to a main surface of the liquid crystal layer, in a case where an interval between the bright portions or between the dark portions in a normal direction of lines formed by the bright portions or the dark portions is represented by a ½ pitch, and in a case where the pitch in the incidence diffraction element is represented by $P_{in}$ and the pitch in the intermediate diffraction element is represented by $P_e$, $P_{in} < P_e$ is satisfied.

In addition, in the light guide element according to the embodiment of the present invention, in a case where the pitch in the emission diffraction element is represented by $P_{out}$, it is preferable that $P_{out} < P_e$ is satisfied.

The image display apparatus according to the embodiment of the present invention comprises:

the above-described light guide element; and a display element that emits an image to the incidence diffraction element of the light guide element.

Figure 1:
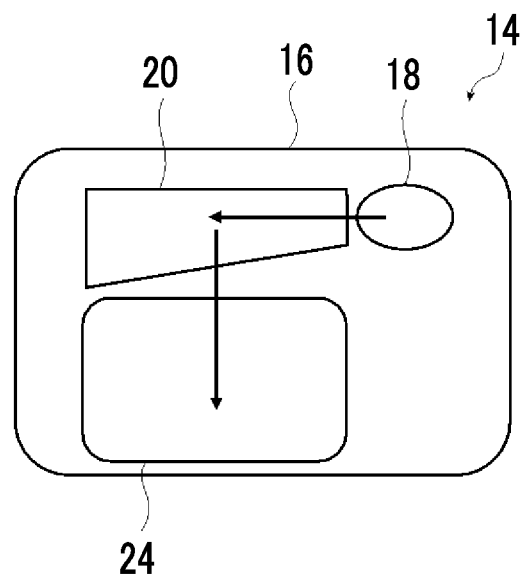
FIG. 1 is a front view conceptually showing an example of an image display apparatus including a light guide element according to the present invention.
Figure 2:
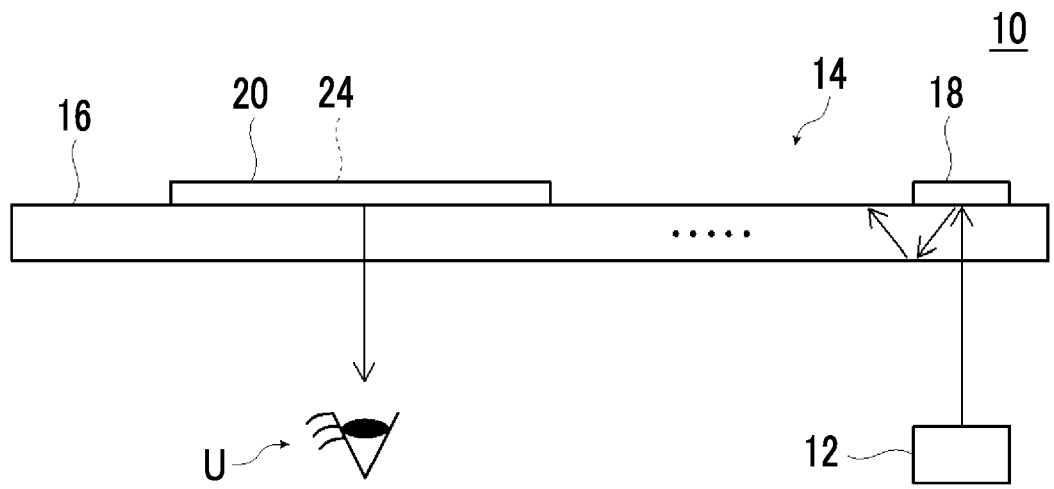
FIG. 2 is a top view conceptually showing the image display apparatus shown in FIG. 1.
Figure 3:
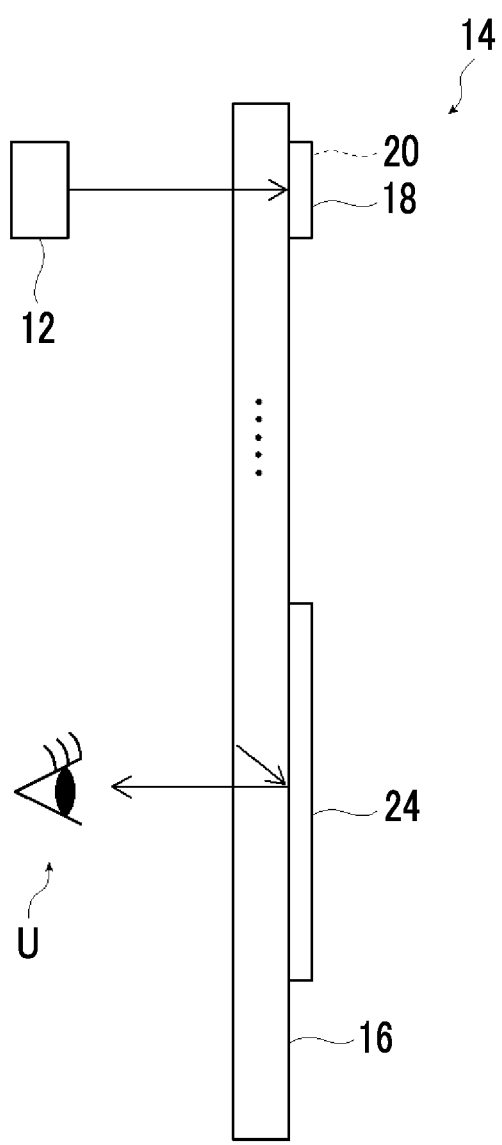
FIG. 3 is a side view conceptually showing the image display apparatus shown in FIG. 1.

FIGS. 1 and 2 conceptually shows an example of the image display apparatus according to the embodiment of the present invention including the light guide element according to the embodiment of the present invention. FIG. 1 is a front view showing an image display apparatus 10 in case of being seen from a surface on a viewing side by a user U. FIG. 2 is a top view showing the image display apparatus 10 in case of being seen from an upper direction on the paper plane of FIG. 1. FIG. 3 is a side view showing the image display apparatus 10 in case of being seen from the right side on the paper plane of FIG. 1.

The image display apparatus 10 shown in FIG. 1 is used as AR glasses as a preferable example. The light guide element according to the embodiment of the present invention can also be used not only as AR glasses but also as an optical element such as a transparent screen, a lighting device (including a backlight unit or the like of a liquid crystal display), or a sensor. In addition, the image display apparatus according to the embodiment of the present invention can also be used as an image display apparatus including the optical element.

The image display apparatus 10 shown in FIGS. 1 to 3 includes: a display element 12; and a light guide element 14 including a light guide plate 16 and an incidence diffraction element 18, an intermediate diffraction element 20, and an emission diffraction element 24 that are disposed on the light guide plate 16. FIG. 1 does not show the display element 12.

In the image display apparatus 10 shown in FIGS. 1 to 3, the incidence diffraction element 18, the intermediate diffraction element 20, and the emission diffraction element 24 are disposed at different positions in the plane direction of the main surface of the light guide plate 16. In the example shown in FIG. 1, the intermediate diffraction element 20 is disposed on the left side of the incidence diffraction element 18 in FIG. 1, and the emission diffraction element 24 is disposed on the lower side of the intermediate diffraction element 20 in FIG. 1. The main surface is the maximum surface of a sheet-shaped material (a plate-shaped material, a film, or the like).

In the image display apparatus 10, an image (light corresponding to the image) displayed by the display element 12 is diffracted by the incidence diffraction element 18 to be incident into the light guide plate 16. In this case, the incidence diffraction element 18 diffracts the light in a direction in which a traveling direction of the diffracted light is directed to the intermediate diffraction element 20. In the example shown in FIG. 1, the incidence diffraction element 18 diffracts the incident light in the left direction in FIG. 1.

The diffracted light by the incidence diffraction element 18 is totally reflected and propagates in the light guide plate 16 such that the diffracted light is incident into the intermediate diffraction element 20. The intermediate diffraction element 20 diffracts the incident light such that the traveling direction of the light is directed to the emission diffraction element 24. In the example shown in FIG. 1, the intermediate diffraction element 20 diffracts the incident light in the lower direction in FIG. 1.

The light diffracted by the intermediate diffraction element 20 is totally reflected and propagates in the light guide plate 16 to be incident into emission diffraction element 24. The emission diffraction element 24 diffracts the incident light to deviate from the angle at which total reflection occurs in the light guide plate 16. In the example shown in FIG. 1, the emission diffraction element 24 diffracts the incident light in a direction perpendicular to the paper plane of FIG. 1. That is, as shown in FIG. 2, the emission diffraction element 24 diffracts the incident light in a direction substantially perpendicular to the main surface of the light guide plate.

The light diffracted by the emission diffraction element 24 is emitted from the light guide plate 16 to the user U. As a result, the image display apparatus 10 can display the image emitted from the display element 12.

Here, the light guide element 14 includes the intermediate diffraction element 20. Therefore, in a case where light is diffracted by the intermediate diffraction element 20, a part of the light is diffracted at a plurality of positions of the intermediate diffraction element such that exit pupil can be expanded.

Here, in the light guide element according to the embodiment of the present invention, the incidence diffraction element, the intermediate diffraction element, and the emission diffraction element include a liquid crystal layer that is formed of a composition including a liquid crystal compound, the liquid crystal layer has a liquid crystal alignment pattern in which a direction of an optical axis derived from the liquid crystal compound changes while continuously rotating in at least one in-plane direction, in a cross-section of the liquid crystal layer observed with a scanning electron microscope (SEM), bright portions and dark portions derived from a liquid crystal phase are tilted with respect to a main surface of the liquid crystal layer, and in a case where an interval between the bright portions or between the dark portions in a normal direction of lines formed by the bright portions or the dark portions is represented by a ½ pitch, the pitch in the incidence diffraction element is represented by $P_{in}$, and the pitch in the intermediate diffraction element is represented by $P_e$, $P_{in} < P_e$ is satisfied.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is along a rod-like major axis direction. In the following description, the optical axis 40A derived from the liquid crystal compound 40 will also be referred to as "the optical axis 40A of the liquid crystal compound 40" or "the optical axis 40A".

The diffraction element including the liquid crystal layer will be described using FIGS. 4 to 6.

Figure 4:
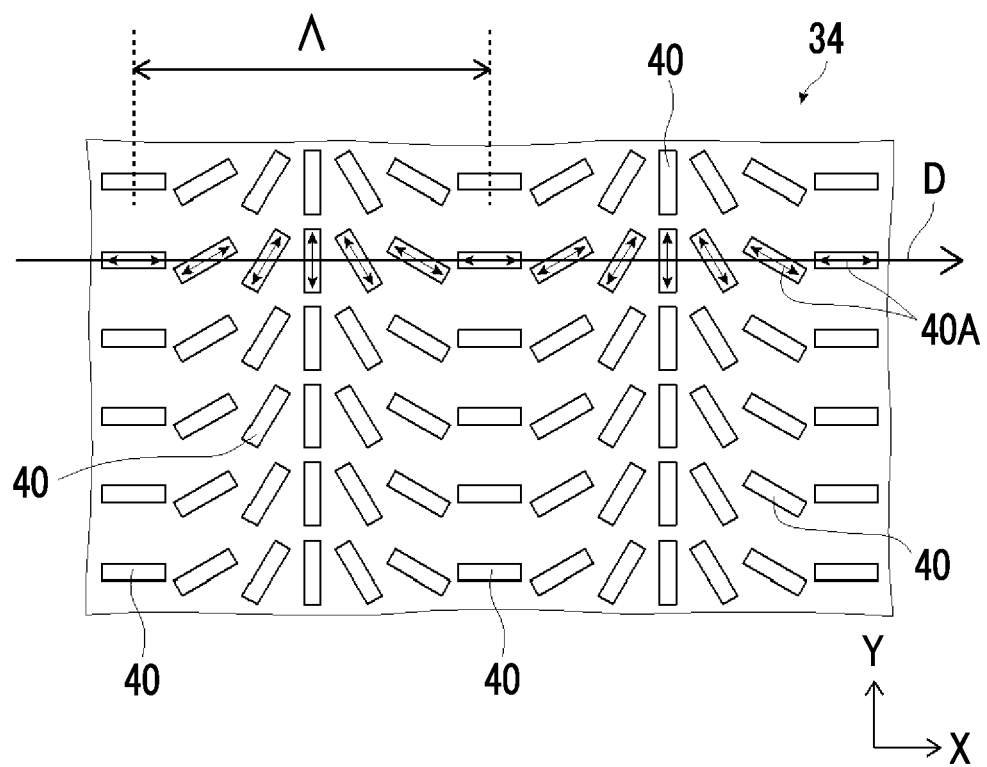
FIG. 4 is a plan view conceptually showing a liquid crystal layer used as a diffraction element.

FIG. 4 is a schematic diagram showing an alignment state of a liquid crystal compound in a plane of a main surface of a liquid crystal layer 34. In addition, FIG. 5 is a schematic cross-sectional view showing a state of a liquid crystal phase in a cross-section perpendicular to the main surface. In the following description, it is assumed that a main surface of the liquid crystal layer 34 is an X-Y plane and a cross-section perpendicular to the X-Y plane is a X-Z plane. That is, FIG. 4 corresponds to a schematic diagram of the X-Y plane of the liquid crystal layer 34, and FIG. 5 corresponds to a schematic diagram of the X-Z plane of the liquid crystal layer 34.

Figure 5:
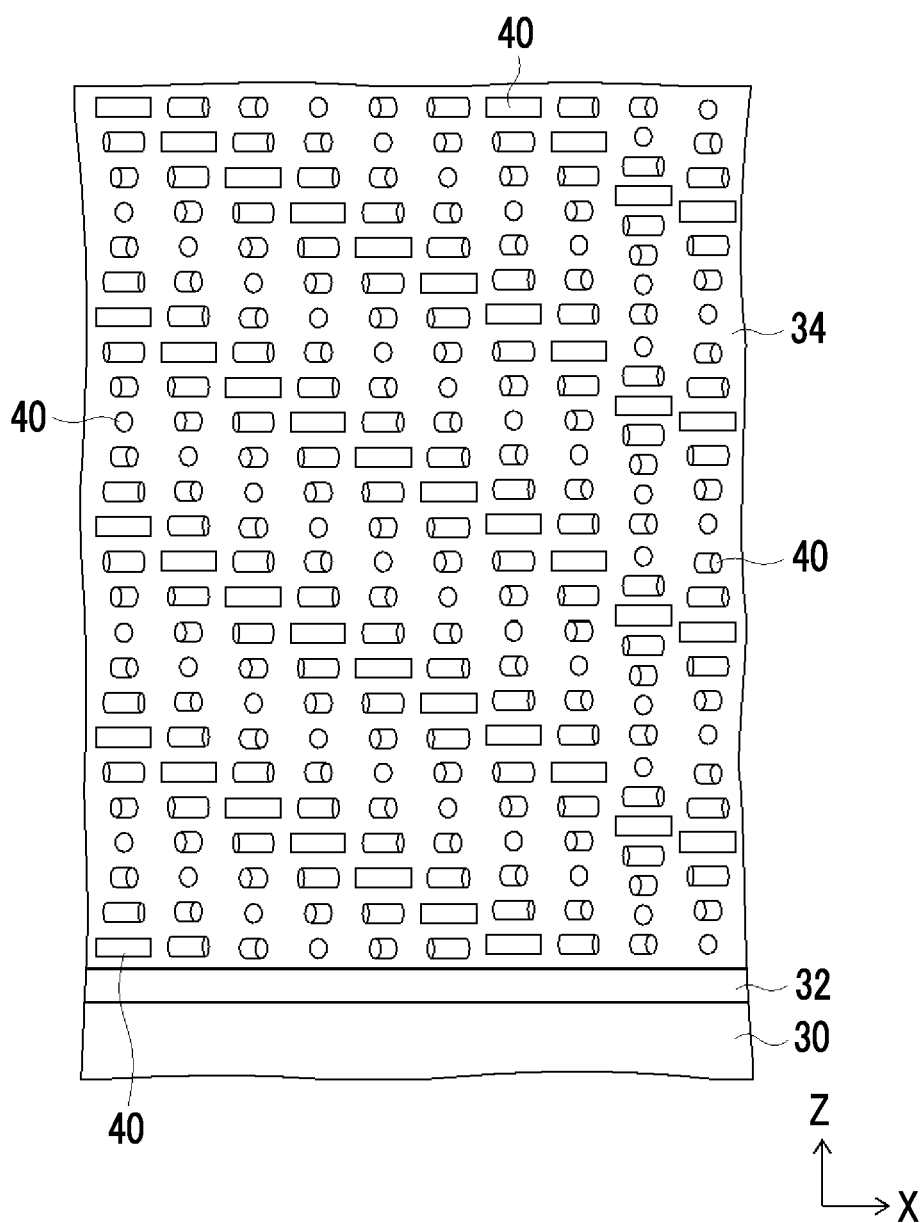
FIG. 5 is a conceptual diagram showing the liquid crystal layer shown in FIG. 4.

In the example shown in FIG. 5, the diffraction element includes a support 30, an alignment film 32, and the liquid crystal layer 34.

Figure 6:
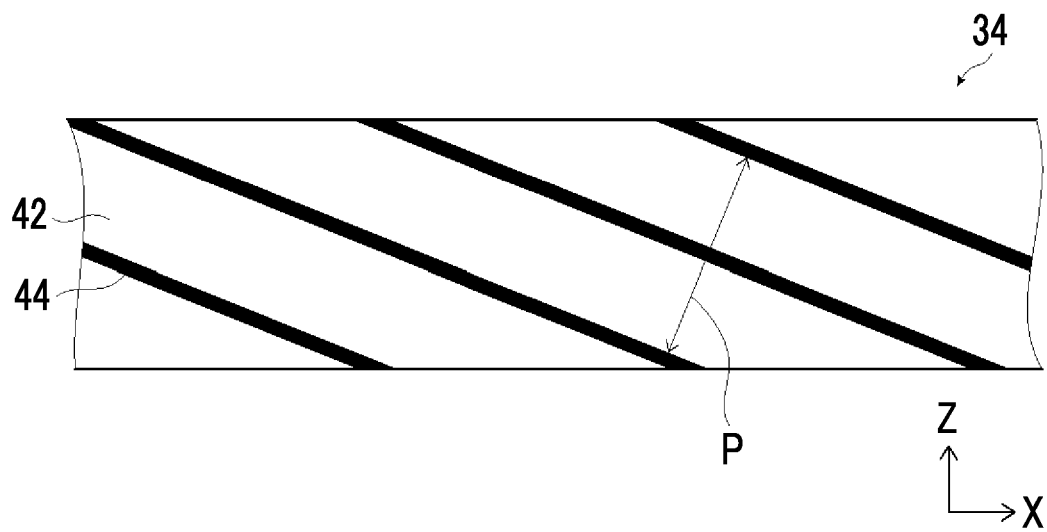
FIG. 6 is a diagram conceptually showing a cross-sectional SEM image of the liquid crystal layer shown in FIG. 4.

The liquid crystal layer shown in FIGS. 4 to 6 is an example of a cholesteric liquid crystal layer obtained by cholesteric alignment of a liquid crystal compound. In addition, the liquid crystal compound is an example of a rod-like liquid crystal compound.

As conceptually shown in FIG. 5, the liquid crystal layer 34 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch, and plural pitches of the helically turned liquid crystal compound 40 are laminated.

As is well-known, the cholesteric liquid crystal layer obtained by immobilizing a cholesteric liquid crystalline phase has wavelength-selective reflectivity.

Although described below in detail, the selective reflection wavelength range of the cholesteric liquid crystal layer depends on the length (pitch P shown in FIG. 6) of one helical pitch described above.

Accordingly, the diffraction element including the liquid crystal layer has wavelength selectivity and diffracts light having a predetermined wavelength. Accordingly, regarding the wavelength of light that is reflected (diffracted) by the diffraction element, the selective reflection wavelength range of the liquid crystal layer may be appropriately set by adjusting the helical pitch P of the liquid crystal layer.

As shown in FIG. 4, in the X-Y plane of the liquid crystal layer 34, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 4, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 34, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane is the length Λ of the single period in the liquid crystal alignment pattern.

That is, a distance between centers of two liquid crystal compounds 40 in the arrangement axis D direction is the length Λ of the single period, the two liquid crystal compounds having the same angle in the arrangement axis D direction. Specifically, as shown in FIG. 4, a distance between centers in the arrangement axis D direction of two liquid crystal compounds 40 in which the arrangement axis D direction and the direction of the optical axis 40A match each other is the length Λ of the single period. In the following description, the length Λ of the single period will also be referred to as "single period Λ".

In the liquid crystal alignment pattern of the liquid crystal layer 34, the single period Λ is repeated in the arrangement axis D direction, that is, in the one in-plane direction in which the direction of the optical axis 40A changes while continuously rotating.

On the other hand, in the liquid crystal compound 40 forming the liquid crystal layer 34, the directions of the optical axes 40A are the same in the direction (in FIG. 4, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 34, angles between the optical axes 40A of the liquid crystal compound 40 and the arrow X direction are the same in the Y direction.

In a case where the X-Z plane of the liquid crystal layer 34 shown in FIG. 5 is observed with a SEM, an arrangement direction in which bright portions 42 and dark portions 44 are alternately arranged as shown in FIG. 6, a stripe pattern tilted at a predetermined angle with respect to the main surface (X-Y plane) is observed. In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 6, two bright portions 42 and two dark portions 44 correspond to one helical pitch (one helical turn).

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with a SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 7:
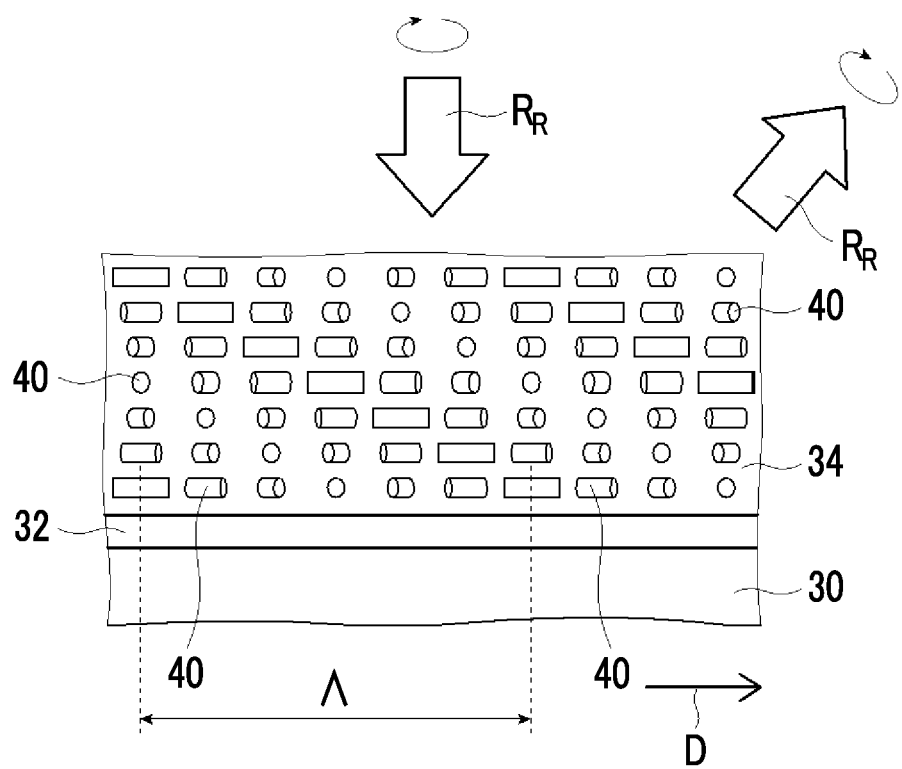
FIG. 7 is a conceptual diagram showing an action of the liquid crystal layer shown in FIG. 4.

On the other hand, the liquid crystal layer 34 reflects incident light in a state where it is tilted in the arrangement axis D direction with respect to the specular reflection. The liquid crystal layer 34 has the liquid crystal alignment pattern in which the optical axis 40A changes while continuously rotating in the arrangement axis D direction in a plane (the predetermined one in-plane direction). Hereinafter, the description will be made with reference to FIG. 7.

For example, it is assumed that the liquid crystal layer 34 is a cholesteric liquid crystal layer that selectively reflects right circularly polarized light $R_R$ of red light. Accordingly, in a case where light is incident into the liquid crystal layer 34, the liquid crystal layer 34 reflects only right circularly polarized light $R_R$ of red light and allows transmission of the other light.

Here, in the liquid crystal layer 34, the optical axis 40A of the liquid crystal compound 40 changes while rotating in the arrangement axis D direction (the one in-plane direction). In addition, the liquid crystal alignment pattern formed in the liquid crystal layer 34 is a pattern that is periodic in the arrangement axis D direction. Therefore, as conceptually shown in FIG. 7, the right circularly polarized light $R_R$ of red light incident into the liquid crystal layer 34 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 34 is applied to a light guide element or the like, the liquid crystal layer 34 can be used as a diffraction element in which light incident from a direction perpendicular to the main surface of the light guide plate can be reflected (diffracted) at an angle at which total reflection occurs in the light guide plate and the light guided in the light guide plate by total reflection can e reflected (diffracted) in a direction perpendicular to the main surface of the light guide plate.

In the liquid crystal layer 34, by appropriately setting the arrangement axis D direction as the one in-plane direction in which the optical axis 40A rotates, the reflection direction (diffraction angle) of light can be adjusted.

In addition, in a case where circularly polarized light having the same wavelength and the same turning direction is reflected, by reversing the rotation direction of the optical axis 40A of the liquid crystal compound 40 toward the arrangement axis D direction, a reflection direction of the circularly polarized light can be reversed.

For example, in FIGS. 4 and 5, the rotation direction of the optical axis 40A toward the arrangement axis D direction is clockwise, and one circularly polarized light is reflected in a state where it is tilted in the arrangement axis D direction. By setting the rotation direction of the optical axis 40A to be counterclockwise, the circularly polarized light is reflected in a state where it is tilted in a direction opposite to the arrangement axis D direction.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates clockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates clockwise in the arrangement axis D direction. As a result, the left circularly polarized light is reflected in a state where it is tilted in a direction opposite to the arrangement axis D direction.

In the liquid crystal layer, the length over which the optical axis of the liquid crystal compound rotates by 180° in the liquid crystal alignment pattern of the liquid crystal compound is the single period $\Lambda$ of the diffraction structure, and the one in-plane direction (arrangement axis D direction) in which the optical axis of the liquid crystal compound changes while rotating is the periodic direction of the diffraction structure.

In the liquid crystal layer having the liquid crystal alignment pattern, as the single period $\Lambda$ decreases, the angle of reflected light with respect to the incidence light increases.

That is, as the single period $\Lambda$ decreases, reflected light can be reflected in a state where it is largely tilted with respect to incidence light.

As described above, in the light guide element according to the embodiment of the present invention, the incidence diffraction element 18, the intermediate diffraction element 20, and the emission diffraction element 24 include the liquid crystal layer having the liquid crystal alignment pattern in which the bright portions and the dark portions in the cross-section of the SEM are tilted. The incidence diffraction element 18, the intermediate diffraction element 20, and the emission diffraction element 24 reflect (diffract) light having the same wavelength. In the light guide element according to the embodiment of the present invention, the pitch $P_e$ of the intermediate diffraction element 20 is more than the pitch $P_{in}$ of the incidence diffraction element 18. In addition, it is preferable the pitch $P_e$ of the intermediate diffraction element 20 is more than the pitch $P_{out}$ of the emission diffraction element 24.

Figure 8:
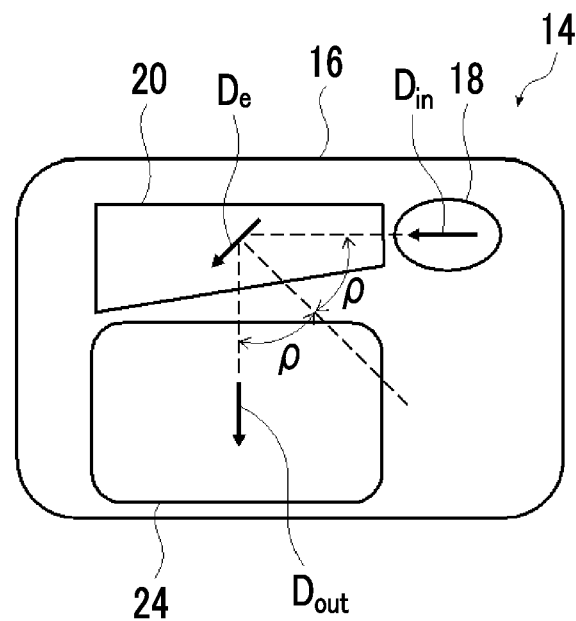
FIG. 8 is a front view illustrating arrangement of diffraction elements in the light guide element according to the present invention.

FIG. 8 is a conceptual front view showing the arrangement of the diffraction elements in the light guide element.

As described above, in a case where light is incident from a direction perpendicular to the main surface, the liquid crystal layer diffracts the light by reflecting the light in a direction along the direction of the arrangement axis D of the liquid crystal alignment pattern. Therefore, as shown in FIG. 8, the incidence diffraction element 18 is disposed such that the diffracted light is directed to the direction of the intermediate diffraction element 20 and a direction of an arrangement axis $D_{in}$ is directed to the direction of the intermediate diffraction element 20. In FIG. 8, the arrangement axis $D_{in}$ of the incidence diffraction element 18 is disposed to be parallel to the left-right direction.

On the other hand, in a case where the liquid crystal layer reflects light from a direction perpendicular to the main surface, it is necessary that light is incident from the direction along the direction of the arrangement axis D of the liquid crystal alignment pattern. Therefore, the emission diffraction element 24 is disposed such that light that propagates in the light guide plate 16 incident from the intermediate diffraction element 20 is directed to the direction in which the light is emitted from the light guide plate 16 and a direction of an arrangement axis $D_{out}$ is directed to the direction of the intermediate diffraction element 20. In FIG. 8, the arrangement axis $D_{out}$ of the emission diffraction element 24 is disposed to be parallel to the up-down direction.

On the other hand, the intermediate diffraction element 20 diffracts light such that a traveling direction of light that is totally reflected and guided in the light guide plate 16 in a plane direction changes. In the example shown in FIG. 8, the intermediate diffraction element 20 diffracts light that travels in the left direction in the drawing to travel in the lower direction in the drawing. Therefore, as shown in FIG. 8, a direction of an arrangement axis $D_e$ of the intermediate diffraction element 20 is disposed to intersect with a traveling direction of incident light at a predetermined angle. As a result, the intermediate diffraction element 20 diffracts light such that a traveling direction of the diffracted light intersects with a direction with the direction of the arrangement axis $D_e$ of the intermediate diffraction element 20. Accordingly, the direction of the arrangement axis De of the intermediate diffraction element 20 is disposed to intersect with the direction of the arrangement axis $D_{in}$ of the incidence diffraction element 18 and the direction of the arrangement axis $D_{out}$ of the emission diffraction element 24.

An angle between a line perpendicular to the arrangement axis $D_e$ of the intermediate diffraction element 20 and the arrangement axis $D_{in}$ of the incidence diffraction element 18 substantially matches with an angle between a line perpendicular to the arrangement axis $D_e$ of the intermediate diffraction element 20 and the arrangement axis $D_{out}$ of the emission diffraction element 24 (ρ in FIG. 8). In a case where the angle ρ is a rotation angle, the rotation angle ρ can be set by adjusting a single period $Λ_e$ of the diffraction structure of the intermediate diffraction element 20. For example, in a case where the single period $Λ_e$ of the diffraction structure of the intermediate diffraction element 20 is substantially the same as a single period $Λ_{in}$ of the diffraction structure of the incidence diffraction element 18 and a single period $Λ_{out}$ of the diffraction structure of the emission diffraction element 24, the rotation angle ρ is about 60° (refer to FIG. 9) and decreases as the single period $Λ_e$ of the diffraction structure of the intermediate diffraction element 20 decreases to be less than the single period $Λ_{in}$ of the diffraction structure of the incidence diffraction element 18 and the single period $Λ_{out}$ of the diffraction structure of the emission diffraction element 24.

Here, according to an investigation by the present inventors, it was found that, in a configuration in which an intermediate diffraction element is disposed on a light guide plate such that a traveling direction of light travelling in the light guide plate in a plane changes, the utilization efficiency decreases, and there is a problem in that the brightness of an image to be displayed decreases. Specifically, in the intermediate diffraction element, in a plane direction, light is incident from an oblique direction and emitted from an oblique direction with respect to the arrangement axis $D_{in}$. Therefore, it was found that a wavelength of light that reflects by the intermediate diffraction element with high efficiency deviates from a selective reflection wavelength st at a helical pitch $P_e$ of the liquid crystal layer in the intermediate diffraction element such that a reflection efficiency with respect to a wavelength of incident light decreases. Specifically, a wavelength of light that reflects by the intermediate diffraction element with high efficiency undergoes a short wavelength shift such that a reflection efficiency with respect to light having a shorter wavelength than the selective reflection wavelength set at the pitch $P_e$ increases and a reflection efficiency with respect to light having the selective reflection wavelength set at the pitch $P_e$ decreases. As a result, the light utilization efficiency of the light guide element decreases, and there is a problem in that the brightness of an image to be displayed decreases.

On the other hand, in the light guide element according to the embodiment of the present invention, the pitch $P_e$ of the intermediate diffraction element is more than the pitch $P_{in}$ of the incidence diffraction element and the pitch $P_{out}$ of the emission diffraction element. That is, the pitch $P_e$ of the intermediate diffraction element is set such that the selective reflection wavelength is longer than the selective reflection wavelengths of the incidence diffraction element and the emission diffraction element. As described above, in the intermediate diffraction element, due to the short wavelength shift, the reflection efficiency with respect to the light having a shorter wavelength than the selective reflection wavelength set at the pitch $P_e$ increases. Therefore, by setting the pitch $P_e$ of the intermediate diffraction element to be more than the pitch $P_{in}$ of the incidence diffraction element, the reflection efficiency with respect to the light having the selective reflection wavelengths of the incidence diffraction element and the emission diffraction element can be further improved as compared to a case where the pitch $P_e$ of the intermediate diffraction element is the same as the pitch $P_{in}$ of the incidence diffraction element. As a result, the light utilization efficiency can be improved, and a decrease in the brightness of an image to be displayed can be suppressed.

The pitch $P_e$ of the intermediate diffraction element may be appropriately set depending on the pitch $P_{in}$ of the incidence diffraction element and the pitch $P_{out}$ of the emission diffraction element, that is, the wavelength of light to be reflected (diffracted), the length of the single period $Λ_e$ of the diffraction structure of the intermediate diffraction element, the rotation angle ρ, and the like.

From the viewpoint of reflecting light having the same wavelength, the pitch $P_{out}$ of the emission diffraction element is basically preferably the same as the pitch $P_{in}$ of the incidence diffraction element but may be the different from the pitch $P_{in}$.

The pitch $P_e$ of the intermediate diffraction element is preferably 1.03 times to 1.5 times, more preferably 1.05 times to 1.4 times, and still more preferably 1.1 times to 1.3 times with respect to the pitch $P_{in}$ of the incidence diffraction element.

The range of the rotation angle ρ is not particularly limited and, from the viewpoints of the size of the light guide element and the like, is preferably 20° to 80°, more preferably 30° to 65°, and still more preferably 40° to 50°.

The single period $Λ_{in}$ of the diffraction structure of the incidence diffraction element, the single period $Λ_e$ of the diffraction structure of the intermediate diffraction element, and the single period $Λ_{out}$ of the diffraction structure of the emission diffraction element may be appropriately set depending on the wavelength of incident light, the positional relationship of each of the diffraction elements and the like.

The single period $Λ_{in}$ of the diffraction structure of the incidence diffraction element, the single period $Λ_e$ of the diffraction structure of the intermediate diffraction element, and the single period $Λ_{out}$ of the diffraction structure of the emission diffraction element are preferably 0.1 μm to 1 μm, more preferably 0.13 μm to 0.8 μm, and still more preferably 0.15 μm to 0.7 μm. In addition, the single period $Λ_{in}$ of the diffraction structure of the incidence diffraction element, the single period $Λ_e$ of the diffraction structure of the intermediate diffraction element, and the single period $Λ_{out}$ of the diffraction structure of the emission diffraction element are still more preferably a wavelength λ or less of incident light from the viewpoint of causing light to propagate in the light guide plate by total reflection.

In addition, it is preferable that the single period $Λ_{in}$ of the diffraction structure of the incidence diffraction element, the single period $Λ_e$ of the diffraction structure of the intermediate diffraction element, and the single period $Λ_{out}$ of the diffraction structure of the emission diffraction element satisfy $Λ_e ≤ Λ_{in}$ and $Λ_e ≤ Λ_{out}$.

By setting the single period of the diffraction structure of each of the diffraction elements to be in the above-described range, the rotation angle ρ can be reduced. As a result, exit pupil can be effectively expanded, and the size of the light guide element can be reduced.

Here, in the above-described light guide element, each of the incidence diffraction element, the intermediate diffraction element, and the emission diffraction element includes one liquid crystal layer. However, the present invention is not limited to this example. That is, each of the diffraction elements including the liquid crystal layer may include two or more liquid crystal layers. That is, each of the diffraction elements may be a laminate including a plurality of liquid crystal layers.

In a case where the diffraction element is a laminate including a plurality of liquid crystal layers, in the plurality of liquid crystal layers, formation periods of bright portions and dark portions in cross-sections observed with a SEM, that is, the pitches P can be made to be different. That is, the diffraction element may have a configuration in which the plurality of liquid crystal layers selectively reflect light components having different wavelengths, respectively.

For example, the diffraction element may include two liquid crystal layers including a liquid crystal layer that selectively reflects red light and a liquid crystal layer that selectively reflects green light, and may include three liquid crystal layers including a liquid crystal layer that selectively reflects red light, a liquid crystal layer that selectively reflects green light, and a liquid crystal layer that selectively reflects blue light.

In a case where the diffraction element is a laminate including a plurality of liquid crystal layers, it is preferable that the single periods Λ of the liquid crystal alignment patterns of the liquid crystal layers are different from each other. In addition, in the plurality of liquid crystal layers, it is preferable that the formation periods of the bright portions and the dark portions in the cross-sections, that is, the pitches P are different, the single periods Λ of the liquid crystal alignment patterns in the in-plane direction are different from each other, and a permutation of the lengths of the pitches P and a permutation of the lengths of the single periods Λ match with each other.

For example, in a case where the incidence diffraction element includes a first liquid crystal layer, a second liquid crystal layer, and a third liquid crystal layer, the single period of the liquid crystal alignment pattern of the first liquid crystal layer is represented by Λ1, the single period of the liquid crystal alignment pattern of the second liquid crystal layer is represented by Λ2, and the single period of the liquid crystal alignment pattern of the third liquid crystal layer is represented by Λ3, the pitch of the first liquid crystal layer is represented by P1, the pitch of the second liquid crystal layer is represented by P2, and the pitch of the third liquid crystal layer is represented by P3, it is preferable that Λ1<Λ2<Λ3 is satisfied and P1<P2<P3 is satisfied. The same can be applied to the intermediate diffraction element and the emission diffraction element.

In a case where the diffraction element includes a plurality of liquid crystal layers, by setting the single periods Λ and the pitches P of the liquid crystal layers to satisfy the above-described relationship, light reflected by the liquid crystal layers can be reflected in the same direction.

In a configuration where the diffraction element includes a plurality of liquid crystal layers, for example, the liquid crystal layers reflect three color components including red light, green light, and blue light, respectively, such that the light guide element can display a color image.

For example, the diffraction element also may be configured to include three liquid crystal layers having different selective reflection center wavelengths and to reflect not only light of one color or two or more colors selected from visible light such as red light, green light, or blue light but also infrared light and/or ultraviolet light or to reflect only light other than visible light.

Alternatively, the diffraction element may include two or four more liquid crystal layers having different selective reflection center wavelengths. In addition, the diffraction element may be configured to reflect light other than visible light such as infrared light and/or ultraviolet light in addition to visible light such as red light, green light, and blue light. Alternatively, each of the liquid crystal layers may be configured to reflect light other than visible light such as infrared light and/or ultraviolet light.

In addition, in the image display apparatus, a configuration in which two or more the light guide elements according to the embodiment of the present invention are combined can also be adopted.

Figure 10:
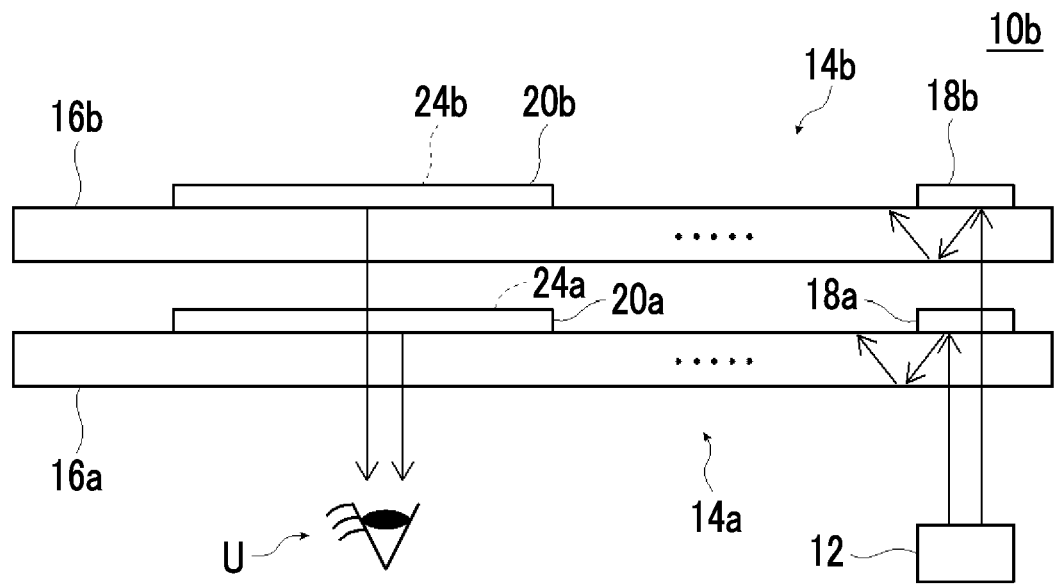
FIG. 10 is a top view conceptually showing still another example of the light guide element according to the embodiment of the present invention.

For example, FIG. 10 conceptually shows an image display apparatus 10b that includes two light guide elements including a light guide element 14a and a light guide element 14b. In this configuration, for example, the light guide element 14a includes a light guide plate 16a and an incidence diffraction element 18a, an intermediate diffraction element 20a, and an emission diffraction element 24a that are provided on the light guide plate 16a, and the light guide element 14b includes a light guide plate 16b and an incidence diffraction element 18b, an intermediate diffraction element 20b, and an emission diffraction element 24b that are provided on the light guide plate 16b.

For example, in the image display apparatus 10b, each of the diffraction elements in the light guide element 14a includes a liquid crystal layer that reflects green light, and each of the diffraction elements in the light guide element 14b includes a liquid crystal layer that reflects blue light and a liquid crystal layer that reflects red light. With this configuration, the image display apparatus 10b can guide each of red light, green light, and blue light.

The image display apparatus including the two light guide elements may also be configured to reflect light of two colors selected from red light, green light, and blue light, to reflect not only light of one color selected from red light, green light, or blue light but also infrared light and/or ultraviolet light, or to reflect only light other than visible light.

Alternatively, the image display apparatus may include three light guide elements including a light guide element for a red image, a light guide element for a green image, and a light guide element for a blue image. That is, the image display apparatus may also be configured to include a light guide element for each color.

The image display apparatus including the two light guide plates includes: a first light guide plate and a second light guide plate; a first light guide element including a first liquid crystal layer and a third liquid crystal layer that are provided on the first light guide plate; and a second light guide element including a second liquid crystal layer that is provided on the second light guide plate, in which in a case where the single period of the liquid crystal alignment pattern of the first liquid crystal layer in the one in-plane direction is represented by Λ1, the single period of the liquid crystal alignment pattern of the second liquid crystal layer in the one in-plane direction is represented by Λ2, and the single period of the liquid crystal alignment pattern of the third liquid crystal layer in the one in-plane direction is represented by Λ3, it is preferable that Λ1<Λ2<Λ3 is satisfied.

In this case, in a case where the pitch of the first liquid crystal layer is represented by P1, the pitch of the second liquid crystal layer is represented by P2, and the pitch of the third liquid crystal layer is represented by P3, it is preferable that P1<P2<P3 is satisfied.

For example, the first light guide element includes the first liquid crystal layer that reflects blue light and the third liquid crystal layer that reflects red light, the second light guide element includes the second liquid crystal layer that reflects green light, and the single periods of the liquid crystal alignment patterns of the respective liquid crystal layers in the one in-plane direction satisfy Λ1<Λ2<Λ3. As a result, blue light, green light, and red light can be reflected substantially in the same direction.

In addition, although not shown in the drawing, the incidence diffraction element 18, the intermediate diffraction element 20, and the emission diffraction element 24 are bonded to the light guide plate using a bonding layer.

In the present invention, as the bonding layer, any layer formed of one of various well-known materials can be used as long as it is a layer that can bond materials as bonding targets. The bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the layers using the bonding layers, the incidence diffraction element 18, the intermediate diffraction element 20, the emission diffraction element 24, and the light guide plate 16 may be laminated and held by a frame, a jig, or the like to configure the light guide element according to the embodiment of the present invention.

Further, the incidence diffraction element 18, the intermediate diffraction element 20, and the emission diffraction element 24 may be directly formed on the light guide plate 16.

Hereinafter, each of the components will be described.

[Display Element]

The display element 12 displays an image (video) to be observed by the user U and emits the image to the incidence diffraction element 18. Accordingly, the display elements 12 are disposed such that the emitted image is incident into the incidence diffraction element 18. In the example shown in FIGS. 1 to 3, the display element 12 is disposed to face the incidence diffraction element 18.

In the image display apparatus 10 according to the embodiment of the present invention, as the display element 12, various well-known display elements (a display device or a projector) used for AR glasses or the like can be used without any particular limitation. Examples of the display element 12 include a display element including a display and a projection lens.

In the image display apparatus 10 according to the embodiment of the present invention, the display is not particularly limited. For example, various well-known displays used in AR glasses or the like can be used.

Examples of the display include a liquid crystal display (including Liquid Crystal On Silicon (LCOS)), an organic electroluminescent display, and a scanning type display employing a digital light processing (DLP) or Micro Electro Mechanical Systems (MEMS) minor.

In a case where each of diffraction elements in a display includes a plurality of liquid crystal layers having different selective reflection wavelengths, a display that displays a polychromic image using light having a wavelength reflected from each of the liquid crystal layers is used.

In addition, in a case where a plurality of light guide elements are provided as shown in FIG. 10, a display that displays a polychromic image using light having a wavelength reflected from a liquid crystal layer in each of diffraction elements of each of the light guide elements is used.

In the display element 12 used in the image display apparatus 10 according to the embodiment of the present invention, the projection lens is also a well-known projection lens (collimating lens) used for AR glasses or the like.

Here, in the image display apparatus 10 according to the embodiment of the present invention, a display image by the display element 12, that is, light to be emitted from the display element 12 is not limited and is preferably polarized light, in particular, circularly polarized light.

In a case where the display element 12 emits circularly polarized light and the display emits an unpolarized light image, and it is preferable that the display element 12 includes, for example, a circular polarization plate consisting of a linear polarizer and an λ/4 plate. In addition, in a case where the display emits a linearly polarized light image, it is preferable that the display element 12 includes, for example, a λ/4 plate.

The light to be emitted by the display element 12 may be another polarized light (for example, linearly polarized light).

[Light Guide Plate]

In the light guide element 14, the light guide plate 16 is a well-known light guide plate that reflects light incident thereinto and guides (propagates) the reflected light.

As the light guide plate 16, various well-known light guide plates used for a backlight unit or the like of AR glasses or a liquid crystal display can be used without any particular limitation.

[Diffraction Element]

The incidence diffraction element 18, the intermediate diffraction element 20, and the emission diffraction element 24 basically have the same configuration, except that the pitches P of the liquid crystal layers, the single periods Λ of the diffraction structures, the arrangement positions of the liquid crystal layers on the light guide plate, and the like are different from each other. Therefore, the incidence diffraction element 18, the intermediate diffraction element 20, and the emission diffraction element 24 will also be referred to as "diffraction element" unless it is necessary to distinguish between the diffraction elements.

As described above, the diffraction element includes a liquid crystal layer is formed using a composition including a liquid crystal compound and has a liquid crystal alignment pattern in which a direction of an optical axis derived from the liquid crystal compound changes while continuously rotating in at least one in-plane direction, in which in a cross-section observed with a SEM, bright portions and dark portions derived from a liquid crystal phase are tilted with respect to the main surface.

The configuration of the liquid crystal layer is as described above. The example shown in FIG. 5 shows the configuration in which, on the X-Z plane of the liquid crystal layer 34, the optical axis 40A of the liquid crystal compound 40 is aligned to be parallel to the main surface (X-Y plane). However, the present invention is not limited to this configuration. For example, as shown in FIG. 11, a configuration in which, on the X-Z plane of the liquid crystal layer 34, the optical axes 40A of the liquid crystal compound 40 is aligned to be tilted with respect to the main surface (X-Y plane) may be adopted.

Figure 11:
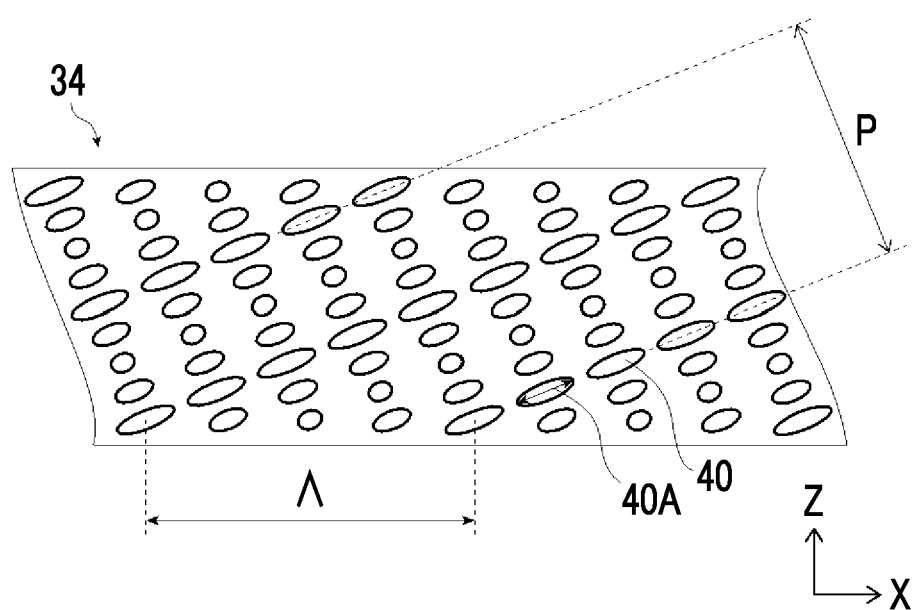
FIG. 11 is a diagram conceptually showing still another example of the liquid crystal layer used as a diffraction element.

In addition, the example shown in FIG. 11 shows the configuration in which, on the X-Z plane of the liquid crystal layer 34, the tilt angle of the liquid crystal compound 40 with respect to the main surface (X-Y plane) is uniform in the thickness direction (Z direction). However, the present invention is not limited to this configuration. In the liquid crystal layer 34, a region where the tilt angle of the liquid crystal compound 40 varies in the thickness direction may be provided.

Figure 12:
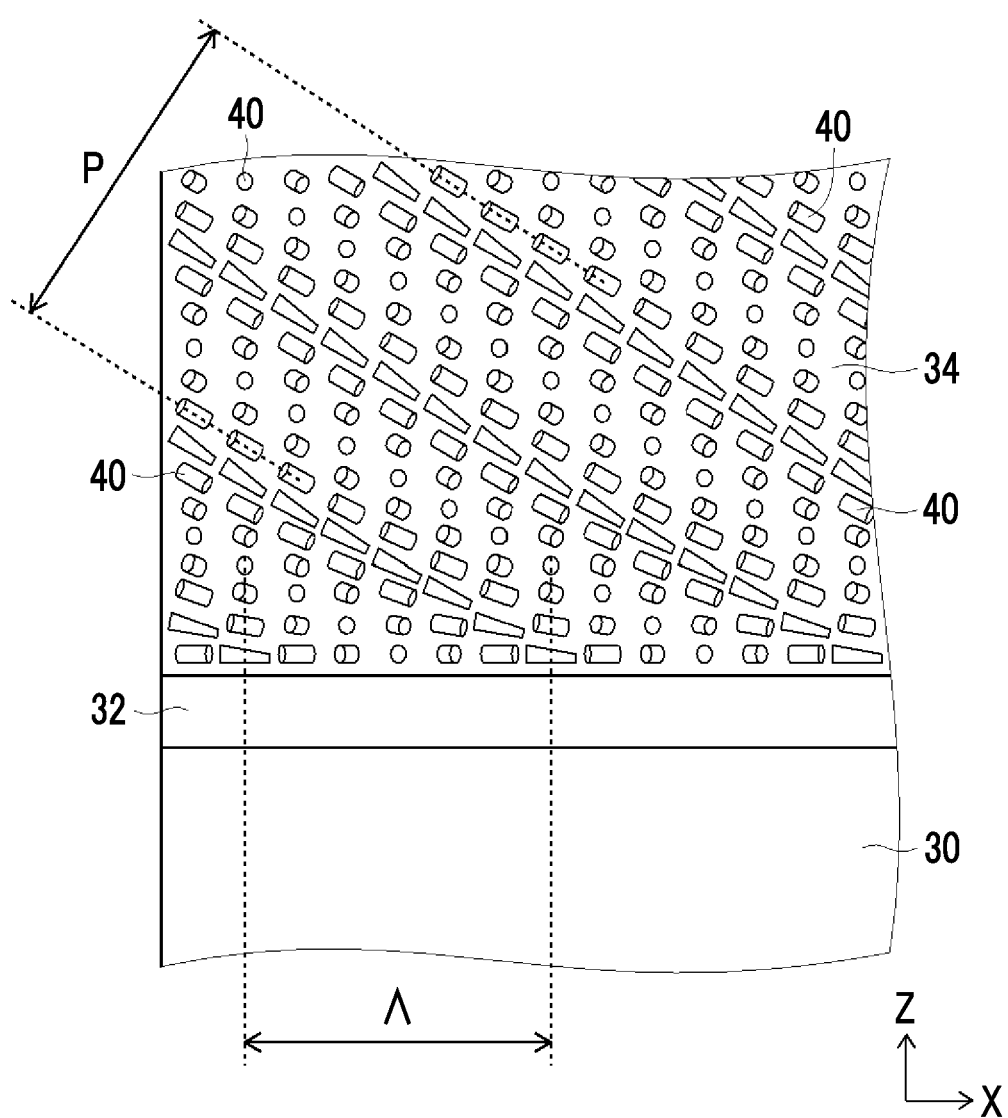
FIG. 12 is a diagram conceptually showing still another example of the liquid crystal layer used as a diffraction element.

For example, in an example shown in FIG. 12, the optical axis 40A of the liquid crystal compound 40 at an interface of the liquid crystal layer on the alignment film 32 side is parallel to the main surface (the pretilt angle is 0°), the tilt angle of the liquid crystal compound 40 increases in a direction away from the interface on the alignment film 32 side to the thickness direction, and the liquid crystal compound is aligned at a given tilt angle on another interface (air interface).

This way, the liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 34 with a polarization microscope. In particular, it is preferable that, on the X-Z plane of the liquid crystal layer 34, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the diffraction element (liquid crystal layer) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is desirable that the tilt angle is controlled by treating the interface of the liquid crystal layer. By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer observed with a SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

In the example shown in FIG. 5, the diffraction element includes the support 30, the alignment film 32, and the liquid crystal layer 34. However, the present invention is not limited to this example. For example, the diffraction element may include only the alignment film 32 and the liquid crystal layer 34 by peeling off the support 30 after bonding the laminate to the light guide plate 16. Alternatively, the diffraction element may include only the liquid crystal layer 34 by peeling off the support 30 and the alignment film 32 after bonding the laminate to the light guide plate 16.

<Support>

The support 30 supports the alignment film 32 and the liquid crystal layer 34.

As the support 30, various sheet-shaped materials (films or plate-shaped materials) can be used as long as they can support the alignment film 32 and the liquid crystal layer 34.

A transmittance of the support 30 with respect to corresponding light is preferably 50% or higher, more preferably 70% or higher, and still more preferably 85% or higher.

The thickness of the support 30 is not particularly limited and may be appropriately set depending on the use of the diffraction element, a material for forming the support 30, and the like in a range where the alignment film 32 and the liquid crystal layer 34 can be supported.

The thickness of the support 30 is preferably 1 to 2000 µm, more preferably 3 to 500 µm, and still more preferably 5 to 250 µm.

The support 30 may have a monolayer structure or a multi-layer structure.

In a case where the support 30 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 30 has a multi-layer structure, examples thereof include a support including: one of the above-described supports having a monolayer structure that is provided as a substrate; and another layer that is provided on a surface of the substrate.

<Alignment Film>

In the diffraction element, the alignment film 32 is formed on a surface of the support 30.

The alignment film 32 is an alignment film for aligning the liquid crystal compound 40 to a predetermined liquid crystal alignment pattern during the formation of the liquid crystal layer 34.

As described above, in the present invention, the liquid crystal layer 34 has a liquid crystal alignment pattern in which a direction of an optical axis 40A (refer to FIG. 4) derived from the liquid crystal compound 40 changes while continuously rotating in one in-plane direction. Accordingly, the alignment film 32 is formed such that the liquid crystal layer 34 can form the liquid crystal alignment pattern.

In the following description, "the direction of the optical axis 40A rotates" will also be simply referred to as "the optical axis 40A rotates".

As the alignment film 32, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film 32 formed by a rubbing treatment can be formed by rubbing a surface of a polymer layer with paper or fabric in a given direction multiple times.

As the material used for the alignment film 32, for example, a material for forming polyimide, polyvinyl alcohol, a polymer having a polymerizable group described in JP1997-152509A (JP-H9-152509A), or an alignment film 32 such as JP2005-97377A, JP2005-99228A, and JP2005-128503A is preferable.

The alignment film 32 can be suitably used as a so-called photo-alignment film obtained by irradiating a photo-alignment material with polarized light or non-polarized light. That is, a photo-alignment film that is formed by applying a photo-alignment material to the support 30 is suitably used as the alignment film 32.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 32 is not particularly limited. The thickness with which a required alignment function can be obtained may be appropriately set depending on the material for forming the alignment film 32.

The thickness of the alignment film 32 is preferably 0.01 to 5 µm and more preferably 0.05 to 2 µm.

A method of forming the alignment film 32 is not limited. Any one of various well-known methods corresponding to a material for forming the alignment film 32 can be used. For example, a method including: applying the alignment film 32 to a surface of the support 30; drying the applied alignment film 32; and exposing the alignment film 32 to laser light to form an alignment pattern can be used.

Figure 13:
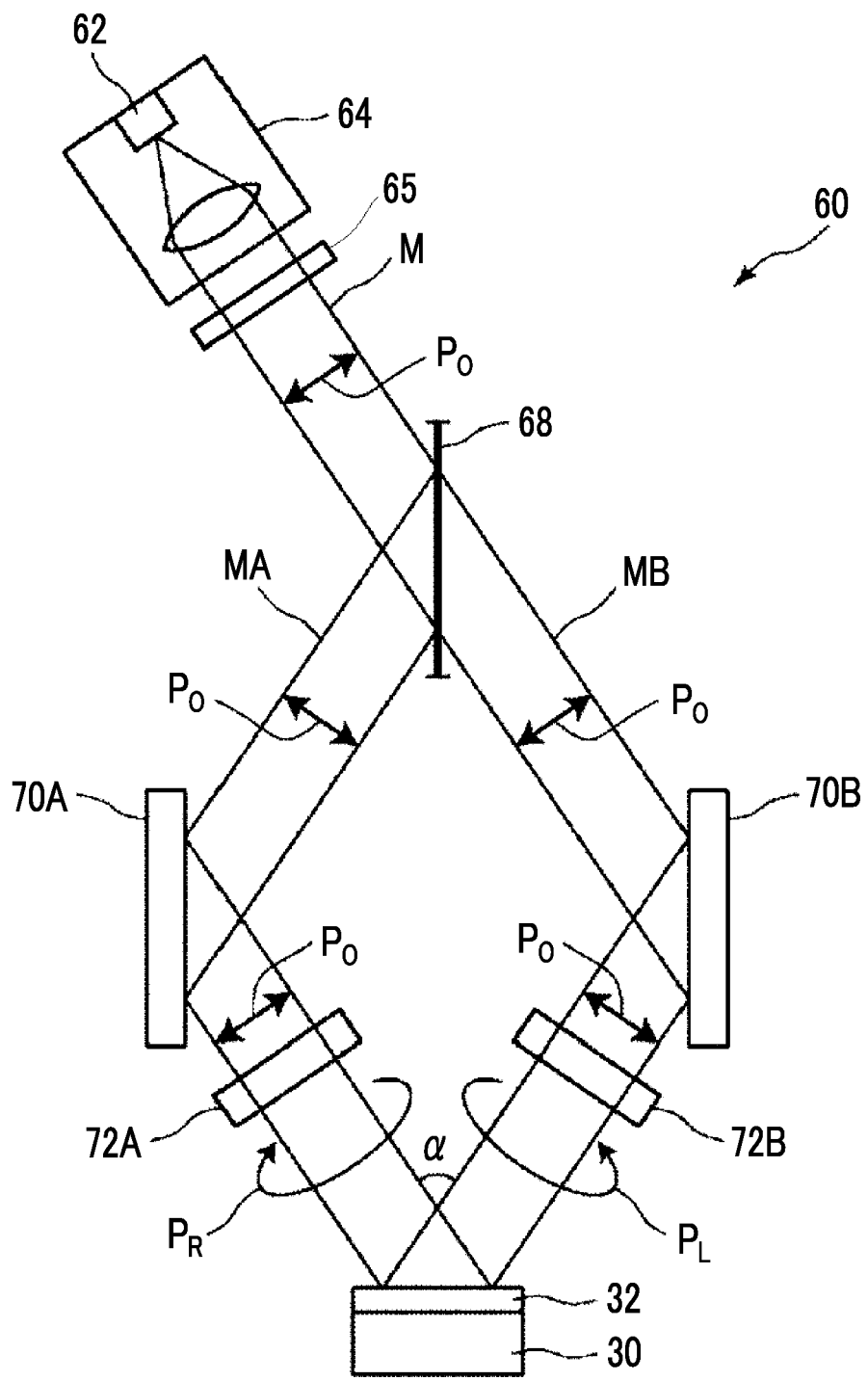
FIG. 13 is a conceptual diagram showing an example of an exposure device that exposes an alignment film.

FIG. 13 conceptually shows an example of an exposure device that exposes the alignment film 32 to form an alignment pattern.

An exposure device 60 shown in FIG. 13 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the two split beams MA and MB; and λ/4 plates 72A and 72B.

The light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_O$ (beam MB) into left circularly polarized light $P_L$.

The support 30 including the alignment film 32 on which the alignment pattern is not yet formed is disposed at an exposed portion, the two beams MA and MB intersect and interfere with each other on the alignment film 32, and the alignment film 32 is irradiated with and exposed to the interference light.

Due to the interference in this case, the polarization state of light with which the alignment film 32 is irradiated periodically changes according to interference fringes. As a result, an alignment film (hereinafter, also referred to as "patterned alignment film") having an alignment pattern in which the alignment state changes periodically is obtained.

In the exposure device 60, by changing an intersecting angle a between the two beams MA and MB, the period of the alignment pattern can be adjusted. That is, by adjusting the intersecting angle a in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the liquid crystal layer on the alignment film 32 having the alignment pattern in which the alignment state periodically changes, the liquid crystal layer 34 having the liquid crystal alignment pattern in which the optical axis 40A derived from the above-described liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction. In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 32 is provided as a preferable aspect and is not an essential component.

For example, the following configuration can also be adopted, in which, by forming the alignment pattern on the support 30 using a method of rubbing the support 30, a method of processing the support 30 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 30 may be made to function as the alignment film.

<<Method of Forming Liquid Crystal Layer>>

The liquid crystal layer can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a liquid crystal phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystal phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586A, WO95/24455A, WO97/00600A, WO98/23580A, WO98/52905A, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystal phase, and curing the liquid crystal compound.

That is, in a case where the cholesteric liquid crystal layer is formed on the alignment film 32, it is preferable that the liquid crystal layer obtained by immobilizing a cholesteric liquid crystalline phase is formed by applying the liquid crystal composition to the alignment film 32, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 mJ/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the liquid crystal layer is not particularly limited, and the thickness with which a required light reflectivity can be obtained may be appropriately set depending on the use of the diffraction element, the light reflectivity required for the liquid crystal layer, the material for forming the liquid crystal layer, and the like.

In the above description, the liquid crystal layer is a cholesteric liquid crystal layer obtained by cholesteric alignment of a liquid crystal compound. However, the present invention is not limited to this example. For example, the liquid crystal layer may have a configuration including a region in which a liquid crystal compound is not helically cholesterically aligned in a thickness direction and is twisted at a twisted angle of less than 360° and rotates.

Hereinabove, the light guide element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Incidence Diffraction Element A1>
(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

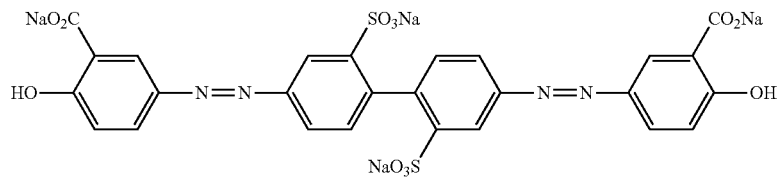

(Exposure of Alignment Film)

The alignment film was exposed using the exposure device shown in FIG. 13 to form an alignment film P-1 having an alignment pattern.

In the exposure device, a laser that emits laser light having a wavelength (325 nm) was used as the laser. The exposure amount of the interference light was 1000 mJ/cm$^2$. The single period (the length over which the optical axis rotates by 180°) of an alignment pattern formed by interference of two laser beams was controlled by changing an intersecting angle (intersecting angle α) between the two beams.

(Formation of Liquid Crystal Layer)

As the liquid crystal composition forming the incidence diffraction element A1, the following composition A-1 was prepared. This composition A-1 is a liquid crystal composition forming a cholesteric liquid crystal layer (cholesteric liquid crystalline phase) that reflects right circularly polarized light.

Composition A-1

| | |
|---|---|
| Rod-Like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 6.10 parts by mass |
| Methyl ethyl ketone | 204.00 parts by mass |

Rod-Like Liquid Crystal Compound L-1

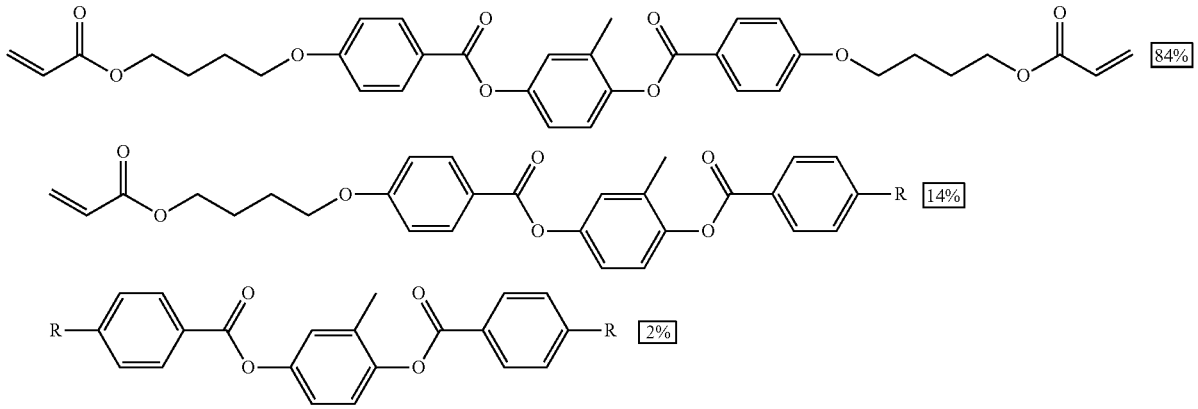

-continued

R: 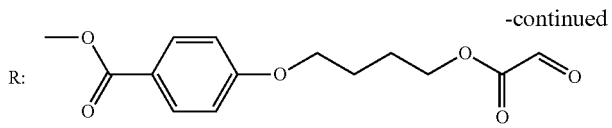

Chiral Agent Ch-1

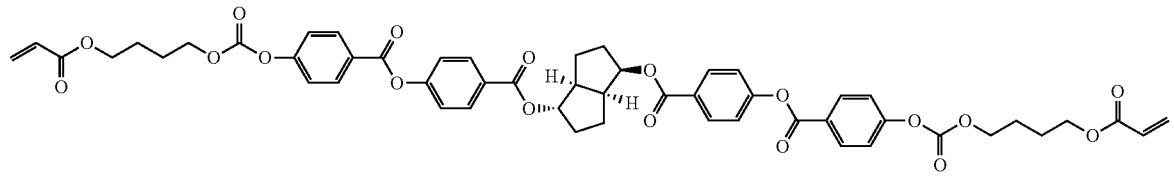 [SMILES: C=CC(=O)OCCCCOC(=O)Oc1ccc(C(=O)Oc2ccc(C(=O)O[C@H]3CC[C@H]4[C@@H]3CC[C@H]4OC(=O)c3ccc(OC(=O)c4ccc(OC(=O)OCCCCOC(=O)C=C)cc4)cc3)cc2)cc1]

The above-described composition A-1 was applied to the alignment film P-1 to form a coating film, the coating film was heated using a hot plate at 80° C. and was irradiated at 80° C. with ultraviolet light having a wavelength of 365 nm at an irradiation dose of 300 mJ/cm² using a high-pressure mercury lamp in a nitrogen atmosphere. As a result, the alignment of the liquid crystal compound is immobilized, and the liquid crystal layer of the incidence diffraction element A1 was formed.

In a case where a cross-section of a coating layer was observed with a scanning electron microscope (SEM), the number of pitches of the normal direction (thickness direction) with respect to the main surface was 8. In addition, the pitch $P_{in}$ of tilted surfaces of bright portions and dark portions with respect to a main surface was 0.31 µm. The bright portions and the dark portions described herein refer to bright portions and dark portions derived from a cholesteric liquid crystalline phase in a case where a cross-section of the cholesteric liquid crystal layer was observed with a SEM.

It was verified using a polarization microscope that the liquid crystal layer of the incidence diffraction element A1 had a periodically aligned surface as shown in FIG. 4. In a case where a cross-section of the coating layer was observed with a SEM, in the liquid crystal alignment pattern of the liquid crystal layer of the incidence diffraction element A1, the single period $\Lambda_{in}$ over which the optical axis of the liquid crystal compound rotated by 180° was 0.32 µm.

(Preparation of Intermediate Diffraction Element A1)

An intermediate diffraction element A1 was prepared using the same method as that of the incidence diffraction element A1, except that the amount of the chiral agent in the composition for forming the liquid crystal layer was changed to 4.87 parts by mass during the exposure of the alignment film and the film thickness was adjusted.

The number of pitches in the liquid crystal layer of the intermediate diffraction element A1 in the thickness direction was two, and the pitch $P_e$ of the liquid crystal layer was 0.39 µm. In addition, in the liquid crystal alignment pattern, the single period $\Lambda_e$ over which the optical axis derived from the liquid crystal compound rotated by 180° was 0.32 µm.

(Preparation of Emission Diffraction Element A1)

An emission diffraction element A1 was prepared using the same method as that of the incidence diffraction element A1, except that the film thickness was adjusted.

(Preparation of Light Guide Element A1)

As the light guide plate, a glass (material) light guide plate formed of glass and having a size of 55 mm×60 mm and a thickness of 1 mm was used.

The incidence diffraction element A1 was cut into a size having a diameter of 6 mm and used. The intermediate diffraction element A1 was cut into a size of 15 mm (maximum)×30 mm and used. The emission diffraction element A1 was cut into a size of 25 mm×30 mm and used.

During the cutting of each of the diffraction elements, a cutting direction and a periodic direction of the diffraction structures were adjusted such that, in a case where the diffraction elements were disposed on the light guide plate, the periodic direction of the diffraction structure was a predetermined direction.

Each of the prepared diffraction elements was bonded to one main surface of the light guide plate using an adhesive.

Figure 9:
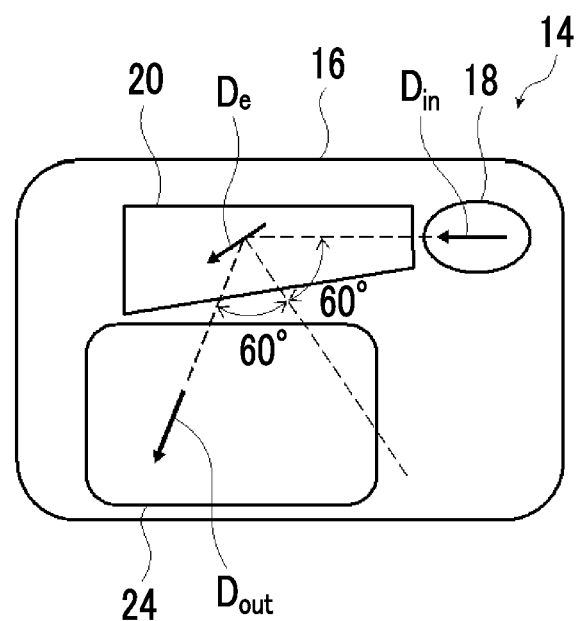
FIG. 9 is a front view conceptually showing another example of the light guide element according to the present invention.

Each of the diffraction elements was disposed as shown in FIG. 9. The intermediate diffraction element A1 and the incidence diffraction element A1 were disposed to be spaced from each other by 1 mm in the left-right direction. In addition, the emission diffraction element A1 and the intermediate diffraction element A1 were disposed to be spaced from each other by 6 mm in the up-down direction.

As a result, a light guide element A1 was prepared. In the light guide element A1, an angle between the periodic direction (the direction of the arrangement axis $D_{in}$) of the diffraction structure in the incidence diffraction element A1 and the periodic direction (the direction of the arrangement axis $D_{out}$) of the diffraction structure in the emission diffraction element A1 was 120°. That is, a rotation angle ρ between a line perpendicular to the arrangement axis $D_e$ of the intermediate diffraction element A1 and the arrangement axis $D_{in}$ of the incidence diffraction element A1 and a rotation angle ρ between a line perpendicular to the arrangement axis $D_e$ of the intermediate diffraction element A1 and the arrangement axis $D_{out}$ of the emission diffraction element A1 are 60°.

[Comparative Example 1]

A light guide element B1 was prepared using the same method as that of Example 1, except that an intermediate diffraction element B1 was prepared using the same method as that of the incidence diffraction element A1.

That is, the pitch $P_e$ of the liquid crystal layer of the intermediate diffraction element B1 was 0.31 µm. In addition, in the liquid crystal alignment pattern, the single period $\Lambda_e$ over which the optical axis derived from the liquid crystal compound rotated by 180° was 0.32 µm.

Example 2

(Preparation of Incidence Diffraction Element A2)

An incidence diffraction element A2 was prepared using the same method as that of the incidence diffraction element A1 of Example 1, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 5.27 parts by mass, and the film thickness was adjusted.

In the liquid crystal layer of the incidence diffraction element A2, the number of pitches in the thickness direction was 8, and in the liquid crystal alignment pattern, the single period $\Lambda_{in}$ over which the optical axis derived from the liquid crystal compound rotated by 180° was 0.39 μm. The pitch $P_{in}$ of the liquid crystal layer was 0.36 μm.

(Preparation of Intermediate Diffraction Element A2)

An intermediate diffraction element A2 was prepared using the same method as that of the incidence diffraction element A2, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.22 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.39 μm. The pitch $P_e$ of the liquid crystal layer was 0.45 μm.

The Precision release Preparation of Emission Diffraction Element A2)

An emission diffraction element A2 was prepared using the same method as that of the incidence diffraction element A2, except that the film thickness was adjusted.

(Preparation of Light Guide Element A2)

A light guide element A2 was prepared using the same method as that of Example 1, except that the incidence diffraction element A2 was used instead of the incidence diffraction element A1, the intermediate diffraction element A2 was used instead of the intermediate diffraction element A1, and the emission diffraction element A2 was used instead of the emission diffraction element A1.

[Comparative Example 2]

A light guide element B2 was prepared using the same method as that of Example 2, except that an intermediate diffraction element B2 was prepared using the same method as that of the incidence diffraction element A2.

That is, the pitch $P_e$ of the liquid crystal layer of the intermediate diffraction element B2 was 0.36 μm. In addition, in the liquid crystal alignment pattern, the single period $\Lambda_e$ over which the optical axis derived from the liquid crystal compound rotated by 180° was 0.39 μm.

Example 3

(Preparation of Incidence Diffraction Element A3)

An incidence diffraction element A3 was prepared using the same method as that of the incidence diffraction element A1 of Example 1, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.42 parts by mass, and the film thickness was adjusted.

In the liquid crystal layer of the incidence diffraction element A3, the number of pitches in the thickness direction was 8, and in the liquid crystal alignment pattern, the single period $\Lambda_{in}$ over which the optical axis derived from the liquid crystal compound rotated by 180° was 0.45 μm. The pitch $P_{in}$ of the liquid crystal layer was 0.43 μm.

(Preparation of Intermediate Diffraction Element A3)

An intermediate diffraction element A3 was prepared using the same method as that of the incidence diffraction element A3, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 3.44 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.45 μm. The pitch $P_e$ of the liquid crystal layer was 0.54 μm.

(Preparation of Emission Diffraction Element A3)

An emission diffraction element A3 was prepared using the same method as that of the incidence diffraction element A3, except that the film thickness was adjusted.

(Preparation of Light Guide Element A3)

A light guide element A3 was prepared using the same method as that of Example 1, except that the incidence diffraction element A3 was used instead of the incidence diffraction element A1, the intermediate diffraction element A3 was used instead of the intermediate diffraction element A1, and the emission diffraction element A3 was used instead of the emission diffraction element A1.

[Comparative Example 3]

A light guide element B3 was prepared using the same method as that of Example 3, except that an intermediate diffraction element B3 was prepared using the same method as that of the incidence diffraction element A3.

That is, the pitch $P_e$ of the liquid crystal layer of the intermediate diffraction element B3 was 0.43 μm. In addition, in the liquid crystal alignment pattern, the single period $\Lambda_e$ over which the optical axis derived from the liquid crystal compound rotated by 180° was 0.45 μm.

Example 4

(Preparation of Intermediate Diffraction Element A4)

An intermediate diffraction element A4 was prepared using the same method as that of the incidence diffraction element A1, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 5.57 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.23 µm. The pitch $P_e$ of the liquid crystal layer was 0.34 µm.

(Preparation of Light Guide Element A4)

A light guide element A4 was prepared using the same method as that of Example 1, except that the intermediate diffraction element A4 was used instead of the intermediate diffraction element A1 and the arrangement of the diffraction elements was changed.

Each of the diffraction elements was disposed as shown in FIG. 8. That is, the incidence diffraction element, the intermediate diffraction element, and the emission diffraction element were disposed such that the rotation angle ρ was 45°.

[Comparative Example 4]

A light guide element B4 was prepared using the same method as that of Example 4, except that the following intermediate diffraction element B4 was used instead of the intermediate diffraction element A4.

(Preparation of Intermediate Diffraction Element B4)

An intermediate diffraction element B4 was prepared using the same method as that of the intermediate diffraction element A4, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 6.10 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.23 µm. The pitch $P_e$ of the liquid crystal layer was 0.31 µm.

Example 5

(Preparation of Intermediate Diffraction Element A5)

An intermediate diffraction element A5 was prepared using the same method as that of the incidence diffraction element A1, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.64 parts by mass, and the film thickness was adjusted. The second liquid crystal layer was not formed.

In the liquid crystal layer, the number of pitches in the thickness direction was 2, and in the liquid crystal alignment pattern, the single period $\Lambda_e$ over which the optical axis derived from the liquid crystal compound rotated by 180° was 0.28 µm. The pitch $P_e$ of the liquid crystal layer was 0.41 µm.

(Preparation of Light Guide Element A5)

A light guide element A5 was prepared using the same method as that of Example 1, except that the intermediate diffraction element A5 was used instead of the intermediate diffraction element A1 and the arrangement of the diffraction elements was changed.

The diffraction elements were disposed as shown in FIG. 8. That is, the incidence diffraction element, the intermediate diffraction element, and the emission diffraction element were disposed such that the rotation angle ρ was 45°.

[Comparative Example 5]

A light guide element B5 was prepared using the same method as that of Example 5, except that the following intermediate diffraction element B5 was used instead of the intermediate diffraction element A5.

(Preparation of Intermediate Diffraction Element B5)

An intermediate diffraction element B5 was prepared using the same method as that of the intermediate diffraction element A5, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 5.27 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.28 µm. The pitch $P_e$ of the liquid crystal layer was 0.36 µm.

Example 6

(Preparation of Intermediate Diffraction Element A6)

An intermediate diffraction element A6 was prepared using the same method as that of the incidence diffraction element A1, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 3.94 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.32 µm. The pitch $P_e$ of the liquid crystal layer was 0.48 µm.

(Preparation of Light Guide Element A6)

A light guide element A6 was prepared using the same method as that of Example 1, except that the intermediate diffraction element A6 was used instead of the intermediate diffraction element A1 and the arrangement of the diffraction elements was changed.

The diffraction elements were disposed as shown in FIG. 8. That is, the incidence diffraction element, the intermediate diffraction element, and the emission diffraction element were disposed such that the rotation angle ρ was 45°.

[Comparative Example 6]

A light guide element B6 was prepared using the same method as that of Example 6, except that the following intermediate diffraction element B6 was used instead of the intermediate diffraction element A6.

(Preparation of Intermediate Diffraction Element B6)

An intermediate diffraction element B6 was prepared using the same method as that of the intermediate diffraction element A6, except that the single period of the alignment pattern to be formed on the alignment film was changed by changing the intersecting angle (intersecting angle α) between two light components during the exposure of the alignment film, the amount of the chiral agent in the composition for forming the liquid crystal layer was changed to 4.42 parts by mass, and the film thickness was adjusted.

In the liquid crystal layer, the number of pitches in the thickness direction was 2, and in the liquid crystal alignment pattern, the single period $\Lambda_e$ over which the optical axis derived from the liquid crystal compound rotated by 180° was 0.32 µm. The pitch $P_e$ of the liquid crystal layer was 0.43 µm.

[Evaluation]

Regarding each of the prepared light guide elements, the brightness of the displayed image was evaluated using the following method. In Examples 1 and 4 and Comparative Examples 1 and 4, the evaluation was performed using light having a wavelength of 450 nm. In Examples 2 and 5 and Comparative Examples 2 and 5, the evaluation was performed using light having a wavelength of 532 nm. In Examples 3 and 6 and Comparative Examples 3 and 6, the evaluation was performed using light having a wavelength of 635 nm. In example 7, the evaluation was performed using the color image.

The configuration of each of Examples and Comparative Examples is shown in the following table.

TABLE 1

|  | Incidence Diffraction Element | | Intermediate Diffraction Element | | Emission Diffraction Element | | | |
| --- | --- | --- | --- | --- | --- | --- | --- | --- |
|  | Single | | | | Single | | | |
|  | Period $\Lambda_{in}$ [µM] | Pitch $P_{in}$ [µM] | Single Period $\Lambda_e$ [µM] | Pitch $P_e$ [µM] | Period $\Lambda_{out}$ [µM] | Pitch $P_{out}$ [µM] | Rotation Angle $\rho$ [°] | $P_e/P_{in}$ |
| Comparative example 1 | 0.32 | 0.31 | 0.32 | 0.31 | 0.32 | 0.31 | 60 | 1 |
| Example 1 | 0.32 | 0.31 | 0.32 | 0.39 | 0.32 | 0.31 | 60 | 1.26 |
| Comparative example 2 | 0.39 | 0.36 | 0.39 | 0.36 | 0.39 | 0.36 | 60 | 1 |
| Example 2 | 0.39 | 0.36 | 0.39 | 0.45 | 0.39 | 0.36 | 60 | 1.25 |
| Comparative example 3 | 0.45 | 0.43 | 0.45 | 0.43 | 0.45 | 0.43 | 60 | 1 |
| Example 3 | 0.45 | 0.43 | 0.45 | 0.54 | 0.45 | 0.43 | 60 | 1.26 |
| Comparative example 4 | 0.32 | 0.31 | 0.23 | 0.31 | 0.32 | 0.31 | 45 | 1 |
| Example 4 | 0.32 | 0.31 | 0.23 | 0.34 | 0.32 | 0.31 | 45 | 1.1 |
| Comparative example 5 | 0.39 | 0.36 | 0.28 | 0.36 | 0.39 | 0.36 | 45 | 1 |
| Example 5 | 0.39 | 0.36 | 0.28 | 0.41 | 0.39 | 0.36 | 45 | 1.14 |
| Comparative example 6 | 0.45 | 0.43 | 0.32 | 0.43 | 0.45 | 0.43 | 45 | 1 |
| Example 6 | 0.45 | 0.43 | 0.32 | 0.48 | 0.45 | 0.43 | 45 | 1.12 |

It can be seen as a result of the evaluation that, in Examples 1 to 6 of the light guide element according to the embodiment of the present invention, the brightness of the displayed image was higher than that of Comparative Example corresponding thereto.

Example 7

The light guide element A1 prepared in Example 1, the light guide element A2 prepared in Example 2, and the light guide element A3 prepared in Example 3 were laminated such that the incidence diffraction elements and the emission diffraction elements thereof overlapped each other in a plane direction, and a display element was disposed such that an image was emitted to the incidence diffraction element. As a result, an image display apparatuses was prepared.

[Comparative Example 7]

The light guide element B1 prepared in Comparative Example 1, the light guide element B2 prepared in Comparative Example 2, and the light guide element B3 prepared in Comparative Example 3 were laminated such that the incidence diffraction elements and the emission diffraction elements thereof overlapped each other in a plane direction, and a display element was disposed such that an image was emitted to the incidence diffraction element. As a result, an image display apparatus was prepared.

[Evaluation]

Regarding the prepared image display apparatus, the brightness of the displayed image was evaluated using the same method as described above. Light components having a wavelength of 450 nm, a wavelength of 532 nm, and a wavelength of 635 nm were used for the evaluation. As a result, it was found that, in Example 7, the brightness of the displayed image was higher even at the wavelength of 450 nm, the wavelength of 532 nm, and the wavelength of 635 nm as compared to Comparative Example 7.

Example 8

The light guide element A1 prepared in Example 5 and the light guide element A2 obtained by laminating the diffraction elements prepared in Examples 4 and 6 were laminated such that the incidence diffraction elements and the emission diffraction elements thereof overlapped each other in a plane direction, and a display element was disposed such that an image was emitted to the incidence diffraction element. As a result, an image display apparatus was prepared. In the light guide element A2, the light guide plate, the diffraction element prepared in Example 4, and the diffraction element prepared in Example 6 were laminated in this order to prepare the light guide element A2. In addition, the light guide plate A1 and the light guide plate A2 were laminated in this order from the light incidence side.

[Comparative Example 8]

The light guide element B1 prepared in Comparative Example 5 and the light guide element B2 obtained by laminating the diffraction elements prepared in Comparative Examples 4 and 6 were laminated such that the incidence diffraction elements and the emission diffraction elements thereof overlapped each other in a plane direction, and a display element was disposed such that an image was emitted to the incidence diffraction element. As a result, an image display apparatus was prepared. In the light guide element B2, the light guide plate, the diffraction element prepared in Comparative Example 4, and the diffraction element prepared in Comparative Example 6 were laminated in this order to prepare the light guide element B2. In addition, the light guide plate B1 and the light guide plate B2 were laminated in this order from the light incidence side.

[Evaluation]

Regarding the prepared image display apparatus, the brightness of the displayed image was evaluated using the same method as described above. Light components having a wavelength of 450 nm, a wavelength of 532 nm, and a wavelength of 635 nm were used for the evaluation. As a result, it was found that, in Example 8, the brightness of the displayed image was higher even at the wavelength of 450 nm, the wavelength of 532 nm, and the wavelength of 635 nm as compared to Comparative Example 8.

As can be seen from the above results, the effects of the present invention are obvious.

The present invention is suitably applicable to various optical devices such as AR glasses in which light guiding is used.

EXPLANATION OF REFERENCES 10, 10b: image display apparatus
12: display element
14, 14a, 14b: light guide element
16: light guide plate
18, 18a, 18b: incidence diffraction element
20, 20a, 20b: intermediate diffraction element
24, 24a, 24b: emission diffraction element
30: support
32: alignment film
34: liquid crystal layer
40: liquid crystal compound
40A: optical axis
42: bright portion
44: dark portion
60: exposure device
62: laser
64: light source
65: $\lambda/2$ plate
68: polarization beam splitter
70a, 70B: mirror
72A, 72B: $\lambda/4$ plate
$R_R$: right circularly polarized light of red light
M: laser light
MA, MB: beam
$P_O$: linearly polarized light
$P_R$: right circularly polarized light
$P_L$: left circularly polarized light
α: intersecting angle
Q: absolute phase
E, E1, E2: equiphase surface
U: user
D, $D_{in}$, $D_e$, $D_{out}$: arrangement axis
Λ, $\Lambda_{in}$, $\Lambda_e$, $\Lambda_{out}$: single period
P, $P_{in}$, $P_e$, $P_{out}$: pitch
ρ: rotation angle

What is claimed is:

1. A light guide element comprising:
a light guide plate; and
an incidence diffraction element, an intermediate diffraction element, and an emission diffraction element that are provided on the light guide plate,
wherein the incidence diffraction element, the intermediate diffraction element, and the emission diffraction element include a liquid crystal layer that is formed of a composition including a liquid crystal compound and has a liquid crystal alignment pattern in which a direction of an optical axis derived from the liquid crystal compound changes while continuously rotating in at least one in-plane direction,
in a cross-section of the liquid crystal layer observed with a scanning electron microscope, bright portions and dark portions derived from a liquid crystal phase are tilted with respect to a main surface of the liquid crystal layer,
in a case where an interval between the bright portions or between the dark portions in a normal direction of lines formed by the bright portions or the dark portions is represented by a ½ pitch, and
in a case where the pitch of the incidence diffraction element is represented by $P_{in}$ and the pitch of the intermediate diffraction element is represented by $P_e$,
$P_{in} < P_e$
is satisfied.

2. The light guide element according to claim 1, wherein in a case where the pitch of the emission diffraction element is represented by $P_{out}$,
$P_{out} < P_e$
is satisfied.

3. The light guide element according to claim 1, wherein in a case where a length over which the direction of the optical axis derived from the liquid crystal compound in the liquid crystal alignment pattern rotates by 180° in an in-plane direction is set as a single period Λ of a diffraction structure, and
in a case where a single period of a diffraction structure of the incidence diffraction element is represented by $\Lambda_{in}$, a single period of a diffraction structure of the intermediate diffraction element is represented by $\Lambda_e$, and a single period of a diffraction structure of the emission diffraction element is represented by $\Lambda_{out}$,
$\Lambda_e \leq \Lambda_{in}$ and
$\Lambda_e \leq \Lambda_{out}$
are satisfied.

4. The light guide element according to claim 1, wherein the liquid crystal layer is a cholesteric liquid crystal layer obtained by immobilizing a cholesteric liquid crystalline phase.

5. The light guide element according to claim 1, wherein in a case where an in-plane retardation is measured from a normal direction of the main surface of the liquid crystal layer and a direction tilted with respect to and a normal line of the main surface, a direction in which the in-plane retardation is minimum in any one of a slow axis plane or a fast axis plane is tilted from the normal direction.

6. The light guide element according to claim 1, wherein periods of diffraction structures of the incidence diffraction element, the intermediate diffraction element, and the emission diffraction element are 0.1 μm or more and 1 μm or less.

7. An image display apparatus comprising:
the light guide element according to claim 1; and
a display element that emits an image to the incidence diffraction element of the light guide element.

8. The light guide element according to claim 2, wherein in a case where a length over which the direction of the optical axis derived from the liquid crystal compound in the liquid crystal alignment pattern rotates by 180° in an in-plane direction is set as a single period Λ of a diffraction structure, and in a case where a single period of a diffraction structure of the incidence diffraction element is represented by $\Lambda_{in}$, a single period of a diffraction structure of the intermediate diffraction element is represented by $\Lambda_e$, and a single period of a diffraction structure of the emission diffraction element is represented by $\Lambda_{out}$, $\Lambda_e \leq \Lambda_{in}$ and $\Lambda_e \leq \Lambda_{out}$ are satisfied.

9. The light guide element according to claim 2, wherein the liquid crystal layer is a cholesteric liquid crystal layer obtained by immobilizing a cholesteric liquid crystalline phase.

10. The light guide element according to claim 2, wherein in a case where an in-plane retardation is measured from a normal direction of the main surface of the liquid crystal layer and a direction tilted with respect to and a normal line of the main surface, a direction in which the in-plane retardation is minimum in any one of a slow axis plane or a fast axis plane is tilted from the normal direction.

11. The light guide element according to claim 2, wherein periods of diffraction structures of the incidence diffraction element, the intermediate diffraction element, and the emission diffraction element are 0.1 μm or more and 1 μm or less.

12. An image display apparatus comprising:
the light guide element according to claim 2; and
a display element that emits an image to the incidence diffraction element of the light guide element.

13. The light guide element according to claim 3, wherein the liquid crystal layer is a cholesteric liquid crystal layer obtained by immobilizing a cholesteric liquid crystalline phase.

14. The light guide element according to claim 3, wherein in a case where an in-plane retardation is measured from a normal direction of the main surface of the liquid crystal layer and a direction tilted with respect to and a normal line of the main surface, a direction in which the in-plane retardation is minimum in any one of a slow axis plane or a fast axis plane is tilted from the normal direction.

15. The light guide element according to claim 3, wherein periods of diffraction structures of the incidence diffraction element, the intermediate diffraction element, and the emission diffraction element are 0.1 μm or more and 1 μm or less.

16. An image display apparatus comprising:
the light guide element according to claim 3; and
a display element that emits an image to the incidence diffraction element of the light guide element.

17. The light guide element according to claim 4, wherein in a case where an in-plane retardation is measured from a normal direction of the main surface of the liquid crystal layer and a direction tilted with respect to and a normal line of the main surface, a direction in which the in-plane retardation is minimum in any one of a slow axis plane or a fast axis plane is tilted from the normal direction.

18. The light guide element according to claim 4, wherein periods of diffraction structures of the incidence diffraction element, the intermediate diffraction element, and the emission diffraction element are 0.1 μm or more and 1 μm or less.

19. An image display apparatus comprising:
the light guide element according to claim 4; and
a display element that emits an image to the incidence diffraction element of the light guide element.

20. The light guide element according to claim 5, wherein periods of diffraction structures of the incidence diffraction element, the intermediate diffraction element, and the emission diffraction element are 0.1 μm or more and 1 μm or less.

* * * * *

UNITED STATES PATENT AND TRADEMARK OFFICE
CERTIFICATE OF CORRECTION

| | |
|---|---|
| PATENT NO. | : 11,592,700 B2 |
| APPLICATION NO. | : 17/824125 |
| DATED | : February 28, 2023 |
| INVENTOR(S) | : Hiroshi Sato et al. |

It is certified that error appears in the above-identified patent and that said Letters Patent is hereby corrected as shown below:

On the Title Page

Item (54), and in the Specification, Column 1, Line 3, in the title:
Change: "EMISSION DIFFRACTION EELMENTS"
To: -- EMISSION DIFFRACTION ELEMENTS --

Signed and Sealed this
Second Day of July, 2024

Katherine Kelly Vidal
*Director of the United States Patent and Trademark Office*